(12) United States Patent
Sato et al.

(10) Patent No.: US 7,416,307 B2
(45) Date of Patent: Aug. 26, 2008

(54) OPTICAL APPARATUS AND PROJECTION APPARATUS

(75) Inventors: Yoshihisa Sato, Saitama (JP); Masami Sato, Chiba (JP)

(73) Assignee: Sony Corporation, Tokyo (JP)

( * ) Notice: Subject to any disclaimer, the term of this patent is extended or adjusted under 35 U.S.C. 154(b) by 293 days.

(21) Appl. No.: 11/218,634

(22) Filed: Sep. 6, 2005

(65) Prior Publication Data

US 2006/0066811 A1    Mar. 30, 2006

(30) Foreign Application Priority Data

Sep. 6, 2004   (JP)   ............... P2004-258634
Aug. 30, 2005  (JP)   ............... P2005/250097

(51) Int. Cl.
*G02F 1/1333*  (2006.01)
*G02F 1/01*    (2006.01)
*G03B 21/28*   (2006.01)

(52) U.S. Cl. .................. 353/81; 353/119; 348/752; 349/58

(58) Field of Classification Search .......... 348/752, 348/756, 757, 758; 353/33, 20, 81, 119, 353/122; 349/58, 57, 62

See application file for complete search history.

(56) References Cited

U.S. PATENT DOCUMENTS

| | | | | |
|---|---|---|---|---|
| 5,605,390 | A * | 2/1997 | Brice et al. .............. | 353/119 |
| 6,709,110 | B2 * | 3/2004 | Domroese et al. ......... | 353/33 |
| 7,188,954 | B2 * | 3/2007 | Suzuki et al. ............ | 353/33 |
| 2006/0044515 | A1 * | 3/2006 | Suzuki .................... | 353/20 |

FOREIGN PATENT DOCUMENTS

| | | |
|---|---|---|
| JP | 2000-180815 | 6/2000 |
| JP | 2000-221587 | 8/2000 |
| JP | 2001-350024 | 12/2001 |
| JP | 2002-244214 | 8/2002 |
| JP | 2003-508813 | 3/2003 |
| JP | 2004-184889 | 7/2004 |
| WO | WO 2004/036307 | 4/2004 |

OTHER PUBLICATIONS

Office Action issued on Oct. 30, 2007, from counterpart Japanese Application No. 2005-250097.

* cited by examiner

*Primary Examiner*—Andrew T Sever
(74) *Attorney, Agent, or Firm*—Finnegan, Henderson, Farabow, Garrett & Dunner, L.L.P.

(57) ABSTRACT

An optical apparatus provided with a light combining prism having three light incident faces, receiving the three beams of light having different wavelength bands through the three light incident faces, and combining the three incident beams of light for output, three reflection type polarization plates, three plate-like reflection type polarization elements provided corresponding to the three reflection type liquid crystal panels, each receiving a different wavelength band of light among the three different wavelength bands, each selecting a first polarized beam component to pass and making it strike the corresponding reflection type liquid crystal panel by two perpendicular polarized beam components, and each making modulated light spatially modulated and converted to a second polarized beam component at the reflection type liquid crystal panel strike the corresponding incident face among the three light incident faces of the combining prism, and at least three fixing plates with surfaces which can be joined with the three light incident faces of the light combining prism, wherein at least the reflection type polarization elements between the reflection type polarization elements and reflection type liquid crystal panels are fixed to the corresponding light incident faces of the light combining prism via the fixing plates, and a projection apparatus using the same.

15 Claims, 20 Drawing Sheets

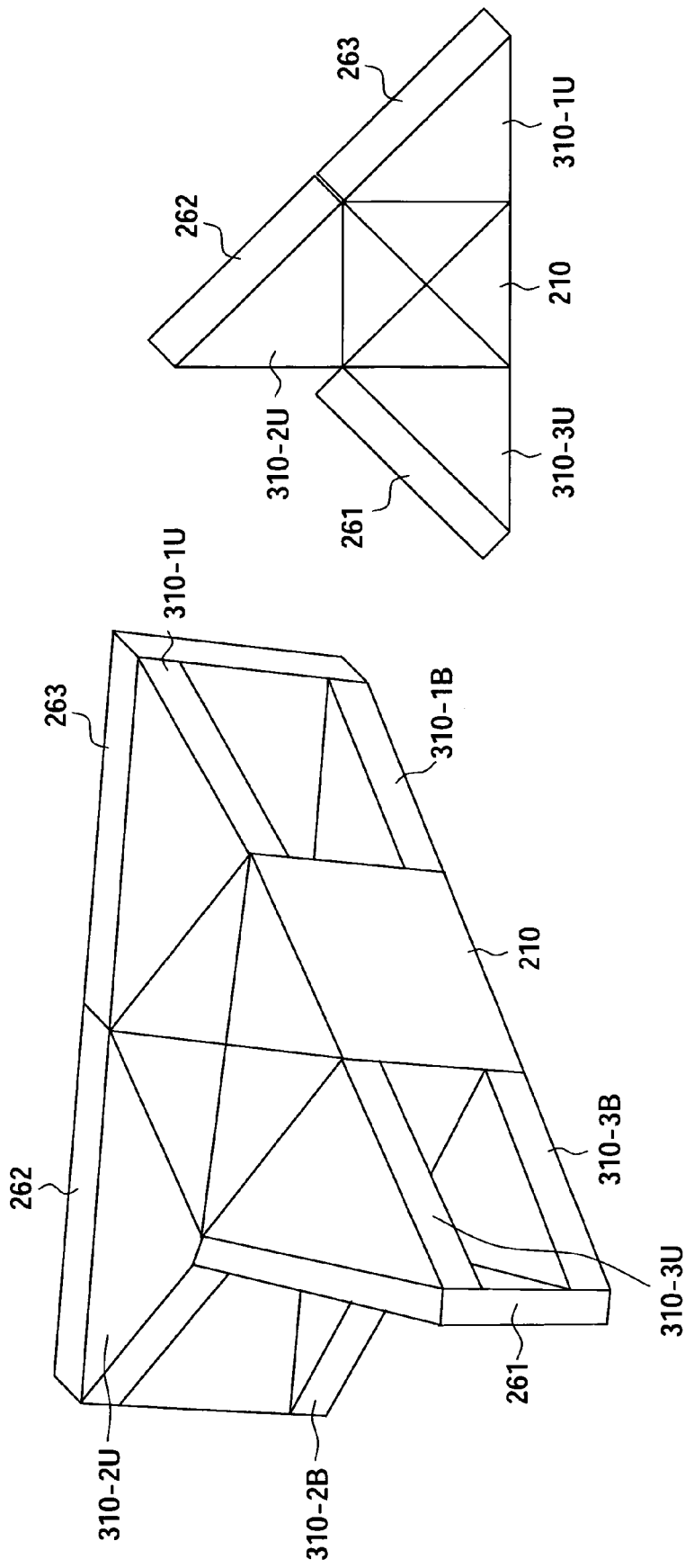

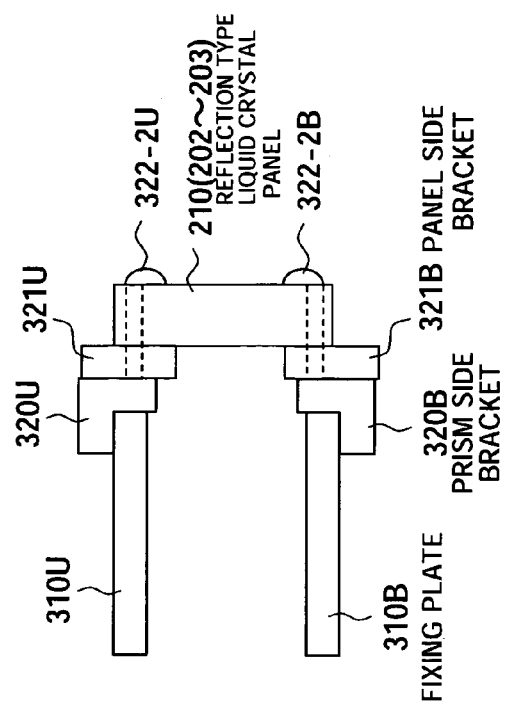
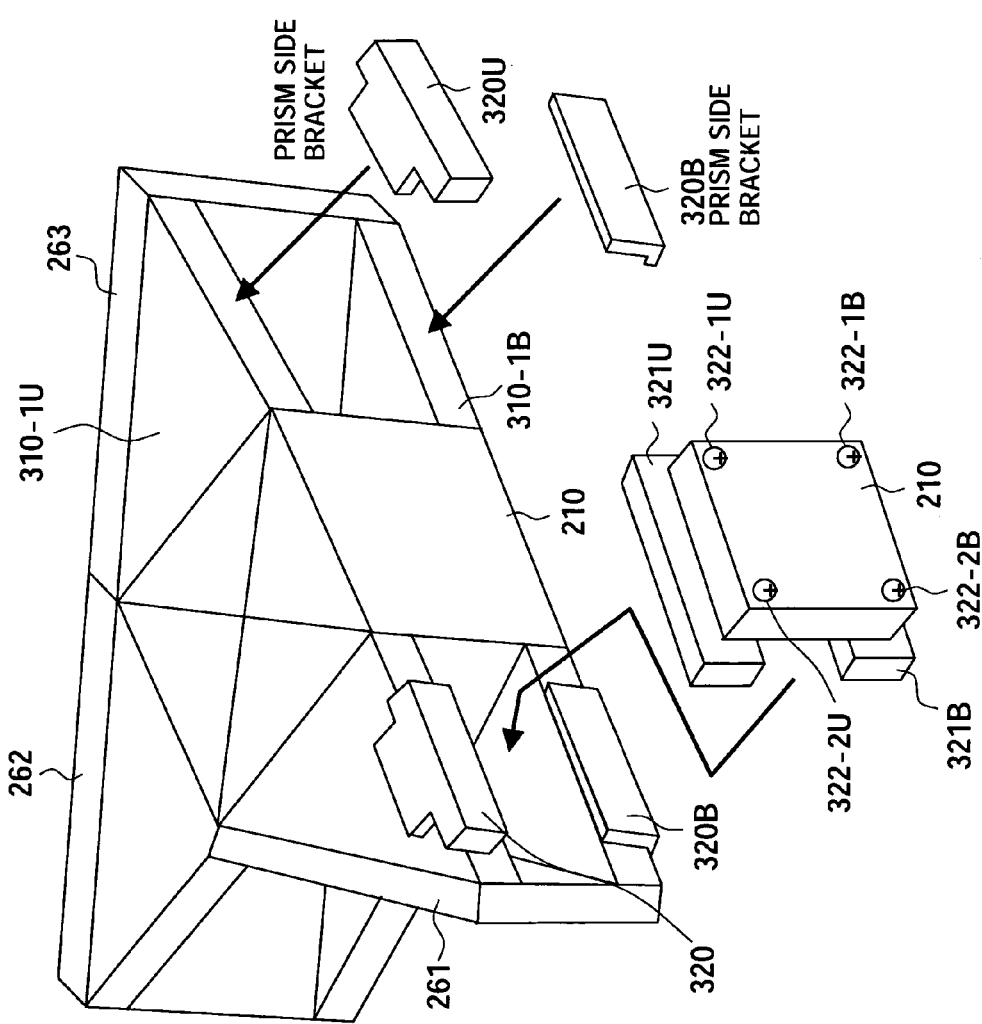

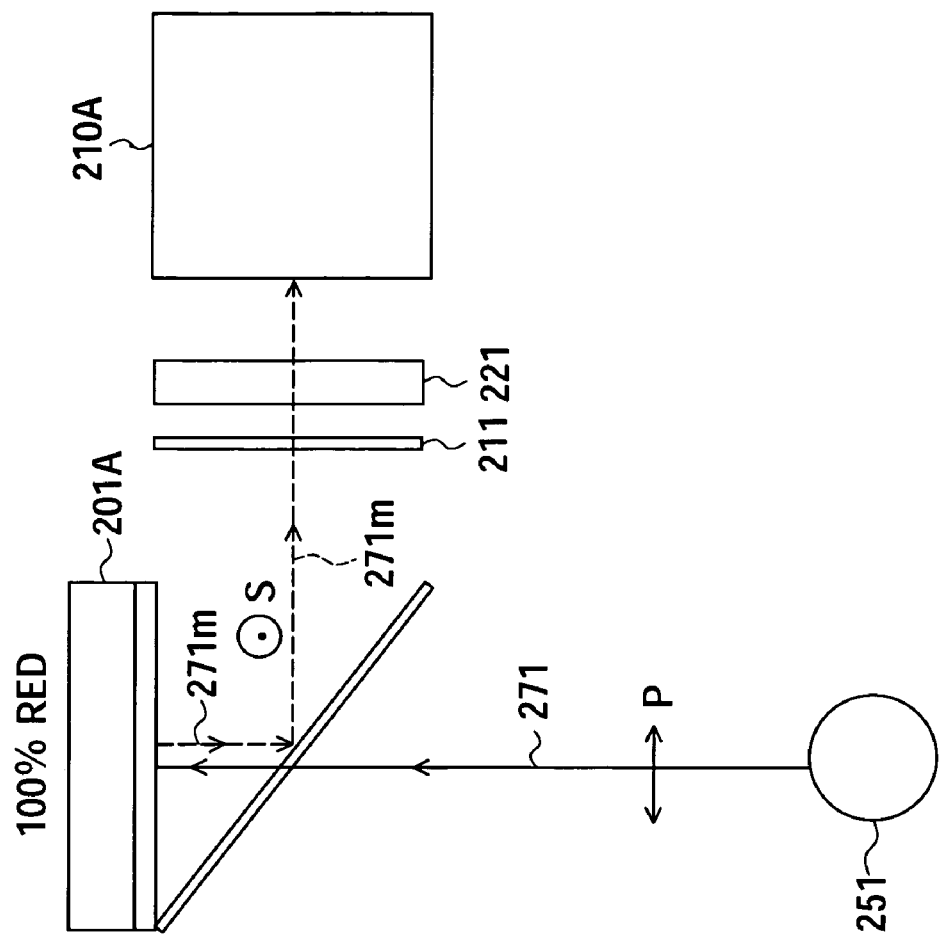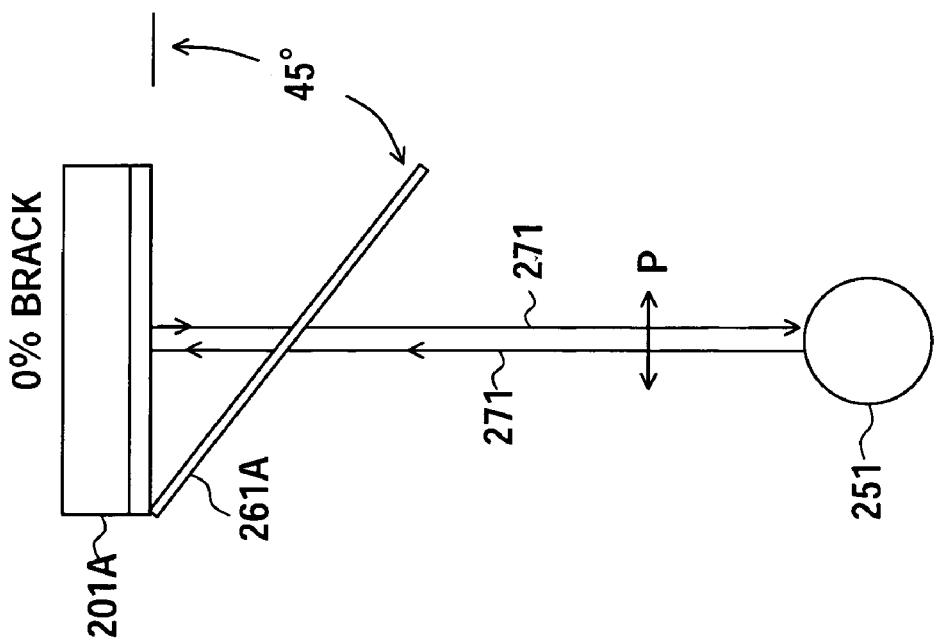

COMPARISON OF TRANSMITTANCE ANGLE DEPENDENCY OF PBF AND PBS

OPTICAL APPARATUS AND PROJECTION APPARATUS

CROSS REFERENCES TO RELATED APPLICATIONS

The present invention contains subject matter related to Japanese Patent Application No. 2004-258634 filed in the Japan Patent Office on Sep. 6, 2004, the entire contents of which being incorporated herein by reference.

BACKGROUND OF THE INVENTION

1. Field of the Invention

The present invention relates to an optical apparatus for combining light modulated by a reflection type liquid crystal display device and to a projection apparatus using the same.

2. Description of the Related Art

Known in the art is a projection type display device for displaying projected image by spatially modulating and emitting incident light and focusing and projecting the emitted light according to an electric signal supplied to a spatial light modulation device. In general, a color display projection apparatus has an illumination optical system having a light source constituted by a lamp and a condensing mirror, splitting the light emitted from the light source to three wavelength bands, and condensing the split lights at corresponding spatial light modulation devices to illuminate, a light combining prism for combining lights modulated by spatial light modulation devices, and a projection lens for projecting the emitted light of the light combining prism to a screen etc. (the projection apparatus will be referred to as a "projector" hereinafter).

A liquid crystal projector uses spatial light modulation devices using liquid crystal materials (hereinafter, referred to as "liquid crystal panels"). As the projector, a transmission type projector passing light through the liquid crystal panels and modulating the light in the process of passing through the liquid crystal panels and a reflection type projector emitting light to the liquid crystal panels and modulating the light when reflected at the liquid crystal panels to change the polarization axes are known.

A reflection type liquid crystal projector using reflection type liquid crystal panels can be realized with small sized panels with a high resolution. A reflection type liquid crystal projector requires use of a polarization element able to combine and split two perpendicular linear polarized beams (s polarized light and p polarized light).

As such a polarization element, a polarized beam splitter constituted by a glass block is known (refer to Japanese Unexamined Patent Publication (Kokai) No. 2001-350024). As disclosed in Japanese Unexamined Patent Publication (Kokai) No. 2001-350024, by forming a plurality of thin films between two pieces of glass, it becomes possible to split or combined two linear polarized beams.

However, such a polarized beam splitter constituted by a glass material is affected in characteristics by distortion of the glass, therefore low distortion glass must be used. For this, lead etc. must be dissolved in the glass resulting in glass having a very high specific gravity. There therefore arises the problem of increase of the weight.

As opposed to this, as a projector realizing a light weight reflection type liquid crystal panel optical system, a projector using a reflection type polarization plate has been proposed (refer to Japanese Unexamined Patent Publication (Kokai) No. 2003-508813). Japanese Unexamined Patent Publication (Kokai) No. 2003-508813 proposes a projector using a wire grid element forming a metal conductor in a lattice state to split incident light into two perpendicular linear polarized beams one of which passes through the plate and the other of which is reflected at the plate. In an optical system using such a reflection type polarization plate, a reduction of weight can be realized.

When using three reflection type liquid crystal panels, inputting the three primary colors of light to the panels, combining the modulated light again, a projector enabling full color display can be realized.

FIG. 1 is a view of the schematic configuration of an optical system of a liquid crystal projector using three liquid crystal panels and able to display not a black and white, but a color image.

This liquid crystal projector 10 has, as shown in FIG. 1, a light source 11 having a lamp 111 and a condensing mirror 112, an illumination optical system 12, three reflection type liquid crystal panels 13R, 13G, and 13B, a light combining prism 14, and a projection lens 15.

The illumination optical system 12 has a lens 121 oriented so that light output from the optical system having the function of aligning the light emitted from the light source 11 with a predetermined polarization (for example p polarization) is emitted toward the reflection type liquid crystal panels 13R, 13G, and 13B, a dichroic mirror 122 for splitting it into light LR having a red wavelength region and light LGB having green and blue wavelength regions, a reflection mirror 123 for reflecting the red light LR split at the dichroic mirror 122, a reflection mirror 124 for reflecting the green and blue light LGB split at the dichroic mirror 122, a dichroic mirror 125 for reflecting only the green wavelength region in the light LGB reflected at the reflection mirror 124 and passing the blue wavelength region therethrough, a polarization plate 126R for passing the p polarized red light LR reflected at the reflection mirror 123 therethrough to make it strike the reflection type liquid crystal panel 13R and reflecting the red light spatially modulated and s polarized at the reflection type liquid crystal panel 13R and making it strike the light combining prism 14, a polarization plate 126G for passing the p polarized green light LG reflected at the dichroic mirror 125 therethrough to make it strike the reflection type liquid crystal panel 13G and reflecting the green light spatially modulated and s polarized at the reflection type liquid crystal panel 13G and making it strike the light combining prism 14, a polarization plate 126B for passing the p polarized blue light LB reflected at the dichroic mirror 125 therethrough to make it strike the reflection type liquid crystal panel 13B and reflecting the blue light spatially modulated and s polarized at the reflection type liquid crystal panel 13B and making it strike the light combining prism 14, and optical lenses 127 to 129 arranged at incident sides of the polarization plates 126R, 126G, and 126B.

In the liquid crystal projector 10, white light output from the light source 11 is made uniform by a not shown integrating optical system (integrator) and aligned with a predetermined polarization by a polarization conversion element (P-S converter). Then, the output light is oriented by the lens 121 of the illumination optical system 11 so as to strike the reflection type liquid crystal panels 13R, 13G, and 13B and then split to three wavelength regions of light by the color splitting mirrors constituted by the dichroic mirrors 122, 125, etc. The split color beams of light strike the reflection type polarization plates. Only the light in a certain polarization direction is selected by the polarization plates 126R, 126G, and 126B and strikes the reflection type liquid crystal panels 13R, 13G, and 13B. The reflection type liquid crystal panels 13R, 13G, and 13B are struck by RGB light.

Video signals (image signals) of colors corresponding to the incident light are supplied to the reflection type liquid crystal panels 13R, 13G, and 13B, whereupon the incident light beams are rotated in polarization directions, modulated, and output according to the video signals. The modulated light beams emitted from the liquid crystal panels strike the polarization plates 126R, 126G, and 126B again. Only the polarized light component rotated by 90 degrees is selected from among the polarized beams of light striking the polarization plates 126R, 126G, and 126B and striking the light combining prism 14. The color beams of light modulated at the three reflection type liquid crystal panels are combined and emitted to the same direction at the light combining prism 14. The emitted combined light from the light combining prism 14 is output and projected to a screen etc. by the projection lens 15.

SUMMARY OF THE INVENTION

In the above mentioned optical system using reflection type polarization plates there are the following disadvantages exist.

In the liquid crystal projector 10, video light obtained by three reflection type liquid crystal panels 13R, 13G, and 13B are passed through the reflection type polarization plates 126R, 126G, and 126B and the light combining prism 14 for combining the video light, whereupon three images are superposed on the screen by the projection lens 15. The positions of the liquid crystal panels are adjusted so that images of three panels are superposed on the screen, then the panels are fixed in place by a binder etc. After fixing them in place, if the reflection type liquid crystal panels or the members up to the projection lens move, there is the problem that the images of the liquid crystal panels will become deviated in position in the projected image on the screen. This will be referred to as "registration deviation".

In the past, in an optical system using reflection type polarization plates, as shown in FIG. 2, a base chassis 16 has a light combining prism 14 affixed to it by bonding etc. Reflection type polarization plates 126R, 126G, and 126B are then fixed onto the base chassis 16 to fix the positions of the reflection type polarization plates with respect to the light combining prism 14.

However, the base chassis 16 is generally made of a metal member. As the metal member, if considering molding, aluminum (linear expansion coefficient of $23.5 \times 10^{-6}$ $K^{-1}$) and magnesium (linear expansion coefficient of $27 \times 10^{-6}$ $K^{-1}$) can be considered. However, both have relatively large thermal expansion coefficients (linear expansion coefficients). For this reason, a change in temperature of the air outside the apparatus etc. will cause the base chassis to expand/shrink resulting in a change in the positional relationship between the reflection type polarization plates and the combining prism and a high possibility of occurrence of registration deviation.

As described above, it is desired to realize an optical apparatus and projection apparatus able to suppress occurrence of registration deviation with a simple configuration.

According to a first aspect of an embodiment of the present invention, there is provided an optical apparatus comprising a light combining prism having three light incident faces, receiving the three beams of light having different wavelength bands through the three light incident faces, and combining the three incident beams of light for output; three reflection type liquid crystal panels; three plate-like reflection type polarization elements disposed corresponding to the three reflection type liquid crystal panels, each receiving a different wavelength band of light among the three different wavelength bands, each selecting a first polarized beam component and making it strike the corresponding reflection type liquid crystal panel, and each providing modulated light spatially modulated and converted to a second polarized beam component at the reflection type liquid crystal panel to the corresponding incident face among the three light incident faces of the light combining prism; and at least three fixing plates with surfaces which can be joined with the three light incident faces of the light combining prism, wherein at least the reflection type polarization elements between the reflection type polarization elements and reflection type liquid crystal panels are fixed to the corresponding light incident faces of the light combining prism via the fixing plates.

Preferably, each of the fixing plates is formed to a trigonal column, among the three side faces, one side face forms a joint surface with a light incident face of the light combining prism, a second side face forms a surface for attachment of the reflection type polarization element, and a third side face forms a surface for attachment of the reflection type liquid crystal panel, and the reflection type polarization elements and the reflection type liquid crystal panels are fixed to the corresponding light incident faces of the light combining prism via the fixing plates.

Preferably, the light incident faces of the light combining prism have optically transparent spacers joined to them, and the fixing plates are joined with the light incident faces in a state supported by side portions of the spacers.

Preferably, a plurality of the fixing plates are joined with the light incident faces of the light combining prism at predetermined intervals.

Preferably, the fixing plates have prism side brackets joined with them, the reflection type liquid crystal panels have panel side brackets fastened to them, and the prism side brackets and the panel side brackets are joined to thus fix the reflection type liquid crystal panels to the corresponding light incident faces of the light combining prism.

Preferably, the fixing plates have linear expansion coefficients of $10 \times 10^{-6}$ $K^{-1}$ or less. Preferably, the fixing plates are made of glass materials. Alternatively, the fixing plates are formed by stainless steel or FeNiCo.

According to a second aspect of an embodiment of the present invention, there is provided a projection apparatus comprising a light source, an optical apparatus for splitting light generated from the light source into three according to the wavelength bands, combining three modulated light beams and emitting the result, and a projecting portion for outputting and projecting the light emitted from the optical apparatus, wherein the optical apparatus has a light combining prism having three light incident faces, receiving the three beams of light having different wavelength bands through the three light incident faces, and combining the three incident beams of light for output; three reflection type liquid crystal panels; three plate-like reflection type polarization elements disposed corresponding to the three reflection type liquid crystal panels, each receiving a different wavelength band of light among the three different wavelength bands, each selecting a first polarized beam component and making it strike the corresponding reflection type liquid crystal panel, and each providing modulated light spatially modulated and converted to a second polarized beam component at the reflection type liquid crystal panel to the corresponding incident face among the three light incident faces of the light combining prism; and at least three fixing plates with surfaces which can be joined with the three light incident faces of the light combining prism, wherein at least the reflection type polarization elements between the reflection type polarization elements and reflection type liquid crystal panels are fixed to the corresponding light incident faces of the light combining prism via the fixing plates.

According to an embodiment of the present invention, plate-like (also including film-like) polarization elements are fixed to the light incident faces of the light combining prism via fixing plates having for example relatively low linear expansion coefficients.

According to an embodiment of the present invention, it becomes possible to prevent registration deviation of the liquid crystal projector by a simple structure.

BRIEF DESCRIPTION OF THE DRAWINGS

These and other objects and features of the present invention will become clearer from the following description of the preferred embodiments given with reference to the attached drawings, wherein:

FIGS. 7A and 7B are views of a state where reflection type polarization elements constituted by polarized beam filters (PBF) are attached to the fixing plates;

FIGS. 9A and 9B are views of an example of a preferred structure for attachment of the reflection type liquid crystal panels to the fixing plates;

FIGS. 19A and 19B are views illustrating partial configurations and beam traces of the image projection apparatus illustrate in FIGS. 16A and 16B;

DESCRIPTION OF THE PREFERRED EMBODIMENTS

Principal Components of Projector

Figure 1:
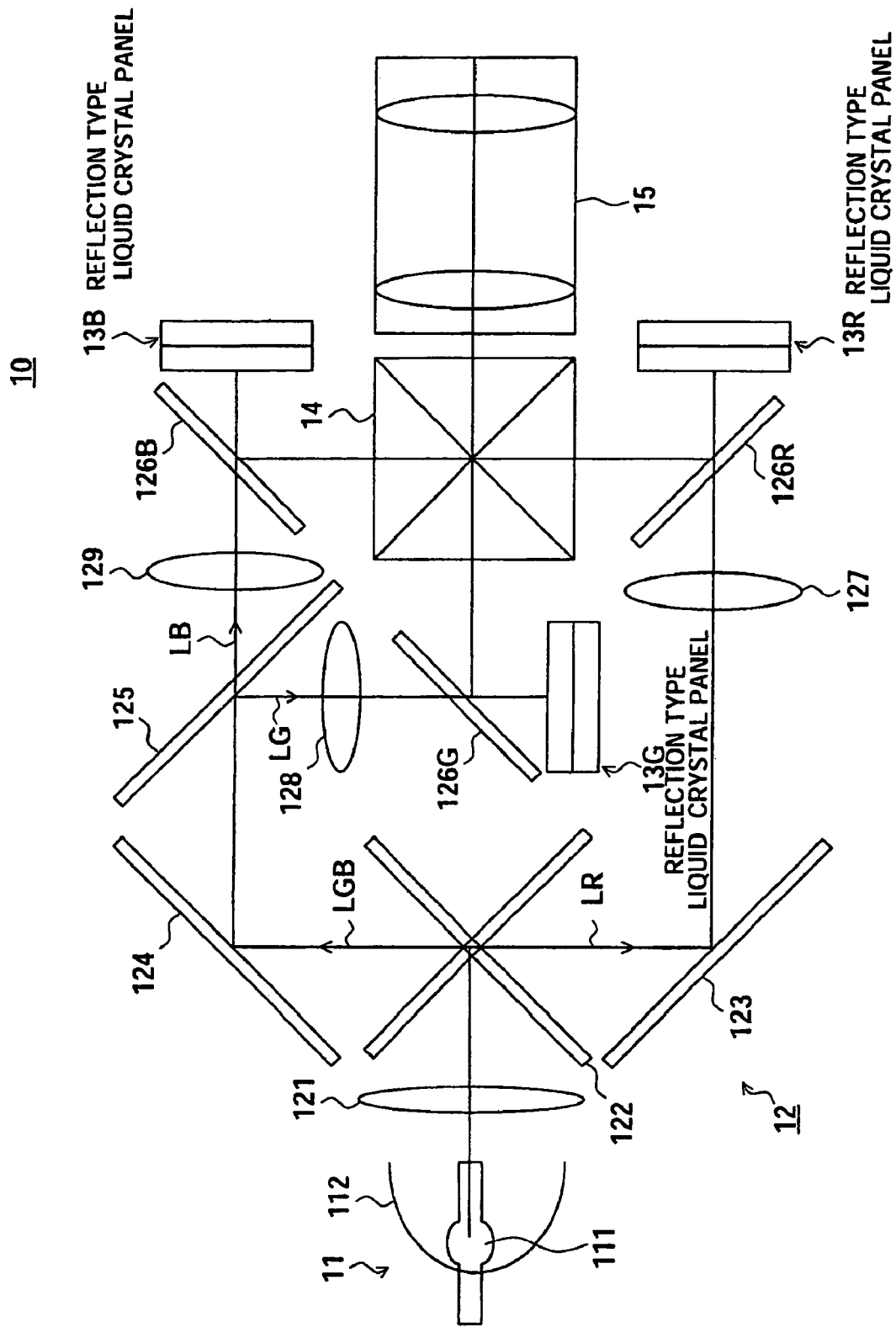
FIG. 1 is a view of an example of the configuration of a reflection type liquid crystal projector in related art.
Figure 2:
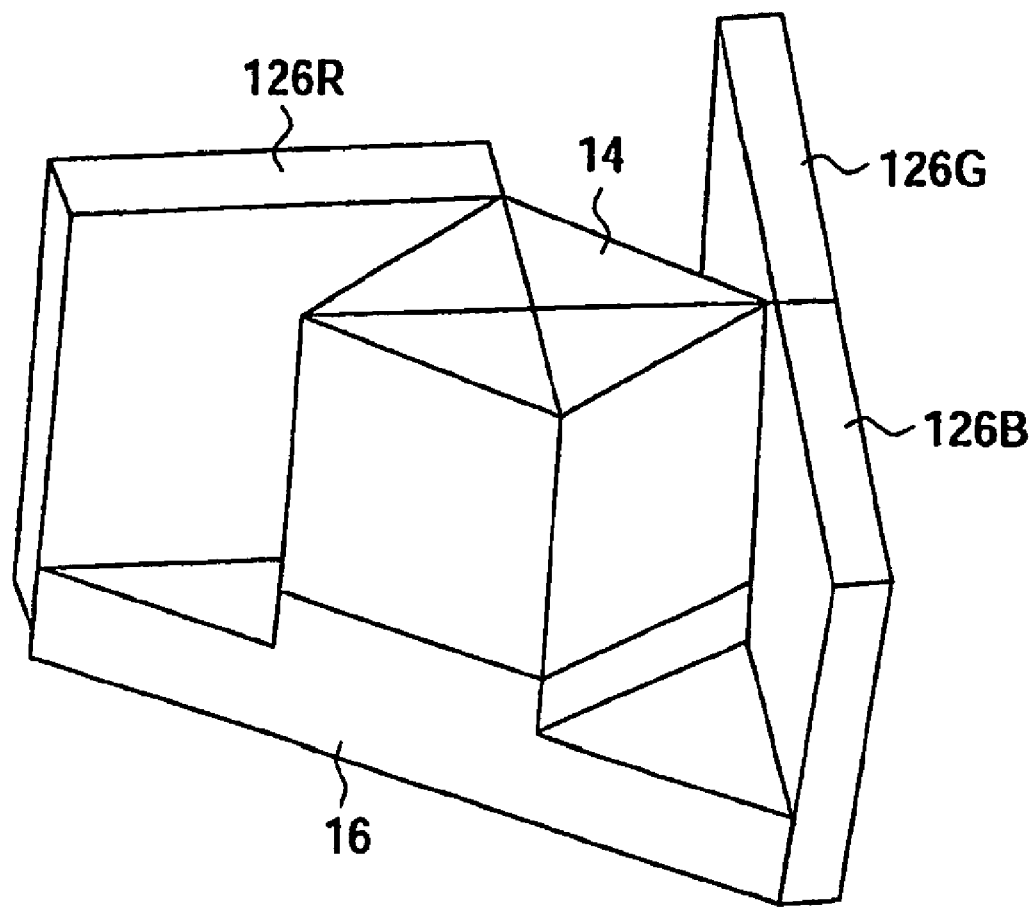
FIG. 2 is a view of an example of mounting reflection type polarization elements to a base plate.

Below, an explanation will be given of a projector according to a first embodiment of the present invention with reference to FIG. 3. Note that the same notations as those of FIG. 1 are assigned for the illumination optical system having the same configuration as that explained in FIG. 1.

Figure 3:
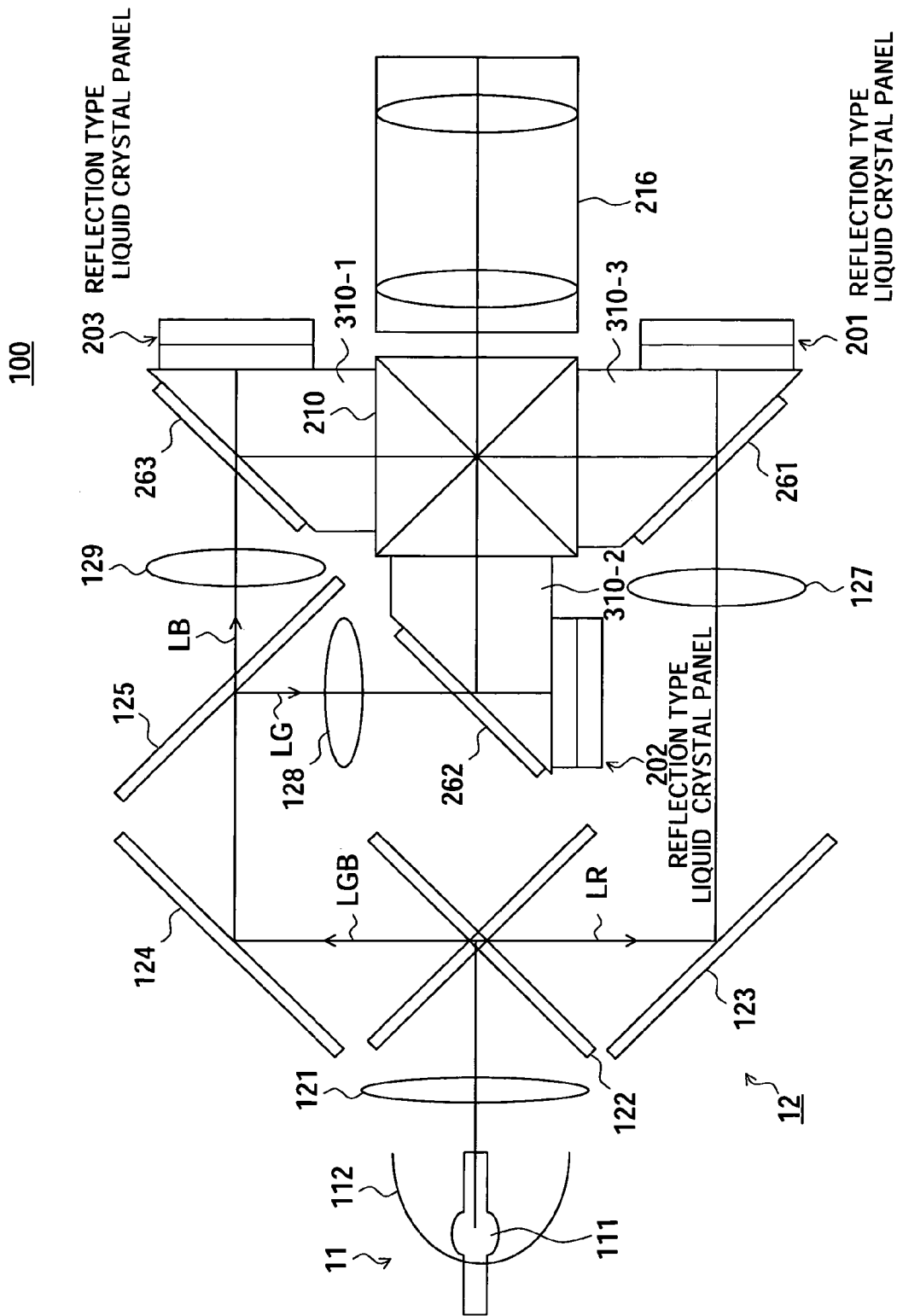
FIG. 3 is a view of a liquid crystal projector employing an optical apparatus according to a first embodiment of the present embodiment.

This liquid crystal projector 100 has, as shown in FIG. 3, a light source 11 having a lamp 111 and a condensing mirror 112, an illumination optical system 12, three reflection type liquid crystal panels 201, 202, and 203, a first polarized beam filters (PBF) 261, a second PBF 262, a third PBF 263, a light combining prism 210, and a projection lens 216.

The illumination optical system 12 has a lens 121 oriented so that light output from the optical system having the function of aligning the light emitted from the light source 11 with a predetermined polarization (for example p polarization) is emitted toward the reflection type liquid crystal panels 201, 202, and 203, a dichroic mirror 122 for splitting it into light LR having a red wavelength region and light LGB having green and blue wavelength regions, a reflection mirror 123 for reflecting the red light LR split at the dichroic mirror 122, a reflection mirror 124 for reflecting the green and blue light LGB split at the dichroic mirror 122, a dichroic mirror 125 for reflecting only the green wavelength region in the light LGB reflected at the reflection mirror 124, and passing the blue wavelength region therethrough, a first PBF 261 for passing the p polarized red light LR reflected at the reflection mirror 123 to make it strike the reflection type liquid crystal panel 201 and reflecting the red light spatially modulated and s polarized at the reflection type liquid crystal panel 201 to make it strike the light combining prism 210, a second PBF 262 for passing the p polarized green light LG reflected at the dichroic mirror 125 to make it strike the reflection type liquid crystal panel 202 and reflecting the green light spatially modulated and s polarized at the reflection type liquid crystal panel 202 to make it strike the light combining prism 210, a third PBF 263 for passing the p polarized blue light LB reflected at the dichroic mirror 125 to make it strike the reflection type liquid crystal panel 203 and reflecting the blue light spatially modulated and s polarized at the reflection type liquid crystal panel 203 to make it strike the light combining prism 21Q, and optical lenses 127 to 129 arranged on incident sides of the first, second, and third PBFs 261, 262, and 263.

The first, second, and third PBFs 261, 262, and 263 and the reflection type liquid crystal panels 201, 202, and 203 are fixed to corresponding light incident faces of the light combining prism 210 via the fixing plates 310-1, 310-2, and 310-3.

In the liquid crystal projector 100, white light output from the light source 11 is integrated by a not shown integration optical system (integrator) and aligned with a predetermined polarization by a polarization conversion element (P-S converter). The output light is oriented by the lens 121 of the illumination optical system 11 so as to strike the reflection type liquid crystal panels 201, 202, and 203, then is split to three wavelength regions of light by the color splitting mirrors constituted by the dichroic mirrors 122, 125, etc. The split color beams strike the reflection type polarization plates. Only light in a certain polarization direction is selected by the first, second, and third PBFs 261, 262, and 263 and strikes the reflection type liquid crystal panels 201, 202, and 203. The reflection type liquid crystal panels 201, 202, and 203 are struck by RGB light.

Video signals (image signals) of colors corresponding to incident light are supplied to the reflection type liquid crystal panels 201, 202, and 203, whereupon the incident light beams are rotated in polarization directions, modulated, and output according to the video signals. The modulated light beams emitted from the liquid crystal panels strike the PBFs 261, 262, and 263 again. Only the polarized beam component rotated by 90 degrees is selected from among the polarized beams striking the PBFs 261, 262, and 263 and striking the light combining prism 210. The color beams modulated at the three reflection type liquid crystal panels are combined to the same direction at the light combining prism 210 and emitted. The emitted combined light from the light combining prism 210 is output and projected to a screen etc. by the projection lens 216.

Structure of Optical Apparatus

First, an explanation will be given of structures for attachment of PBFs of an optical apparatus 300.

Figure 4B:
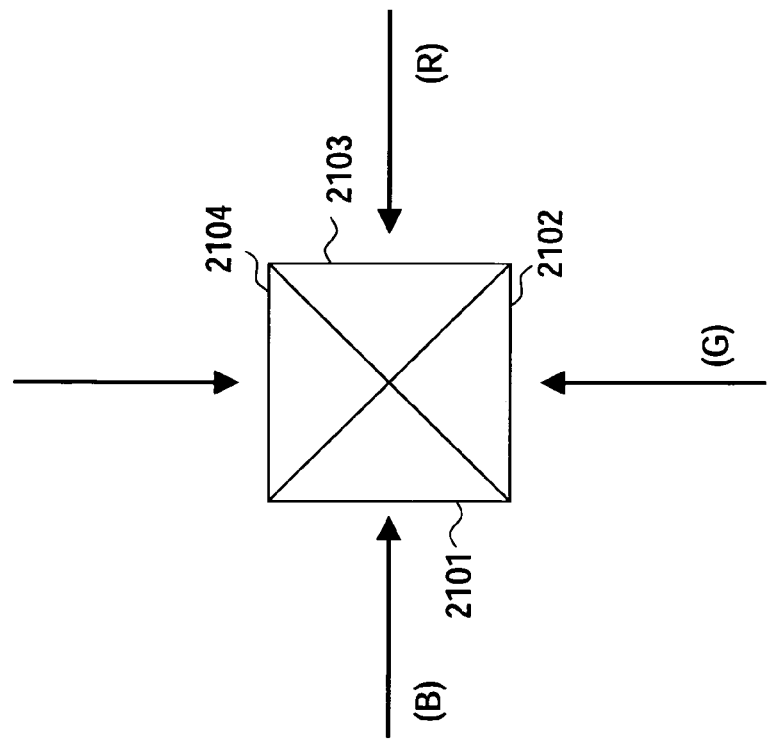
FIGS. 4A and 4B are views for explaining incident faces and an emitting face of a light combining prism.
Figure 4A:
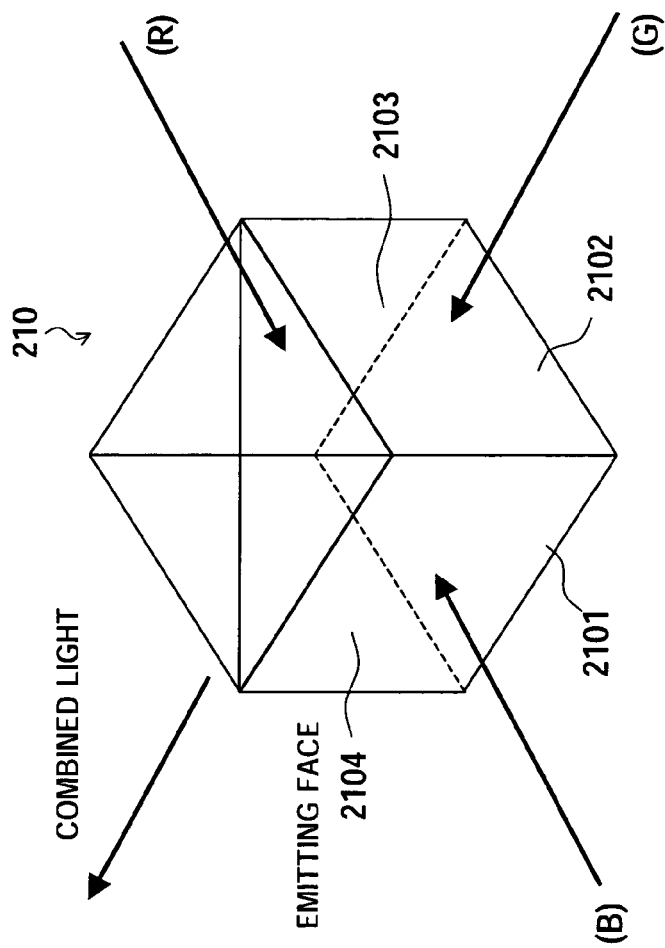

FIGS. 4A and 4B are views for explaining incident faces and an emitting face of the light combining prism.

The light (color) combining prism 210 is constituted by joining for example a plurality of glass prisms (four right-angled isosceles prisms having substantially the same shapes) and two interference filters having predetermined optical characteristics formed at the joined surfaces of the glass prisms. A first interference filter reflects the blue light and allows the red light and green light to pass herethrough. A second interference filter reflects the red light and allows the green light and blue light to pass therethrough. Accordingly, the beams of colored light modulated by the reflection type liquid crystal panels 201, 202, and 203 are combined and strike the projection lens 216.

The light combining prism 210 has a cube or rectangular parallelopiped shape. A first face 2101 forms an incident face of the light reflected at the third PBF 263 and modulated by the liquid crystal panel 203, a second face 2102 perpendicular to the first face 2101 forms an incident face of the light reflected at the second PBF 262 and modulated by the liquid crystal panel 202, and a third face 2103 facing the first face 2101 and perpendicular to the second face 2102 forms an incident face of the light reflected at the first PBF 261 and modulated by the liquid crystal panel 201. Also, in the light combining prism 210, a fourth face 2104 perpendicular to the first face 2101 and the third face 2103 and facing the second face 2102 forms the emitting face of the combined light.

In the present embodiment, the three incident faces of the light combining prism 210 constituted by the first face 2101, the second face 2102, and the third face 2103 have fixing plates formed by for example glass materials joined to them. The first to third PBFs 261 to 263 and the reflection type liquid crystal panels 201 to 203 are attached to these fixing plates.

Figure 5:
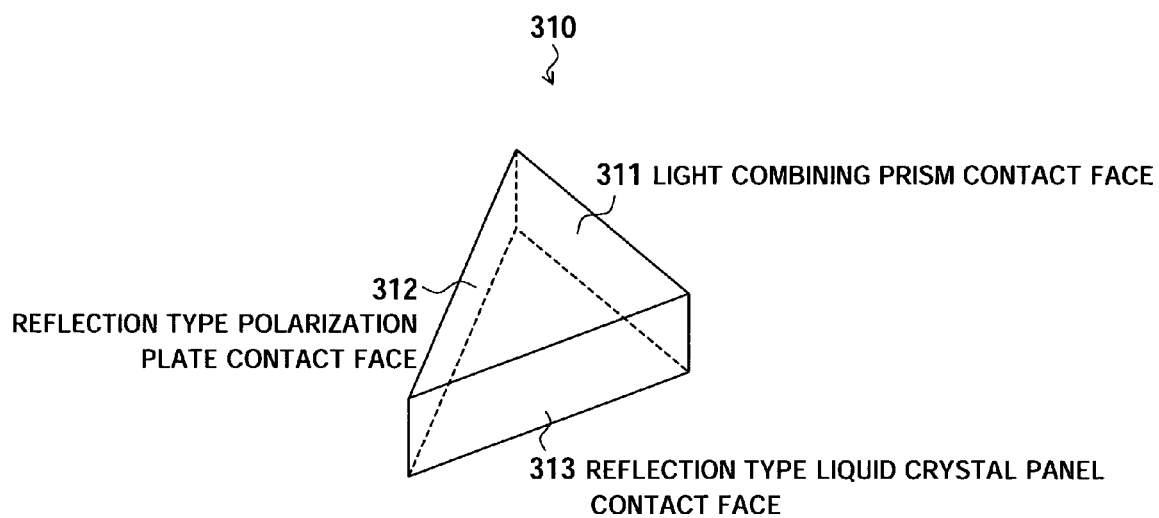
FIG. 5 is a view of an example of the configuration of a fixing plate according to the present invention.

FIG. 5 is a view of an example of the configuration of a fixing plate according to the present embodiment. The fixing plate 310 is formed by, as shown in FIG. 5, for example a trigonal columnar plate having a side cross-section forming a right-angled isosceles triangle. Among three side faces 311 to 313, the side face 311 is the face contacting the light combining prism, the side face 312 is the face contacting the reflection type polarization element constituted by the PBF, and the side face 313 becomes a face holding the reflection type liquid crystal panel.

Figure 6:
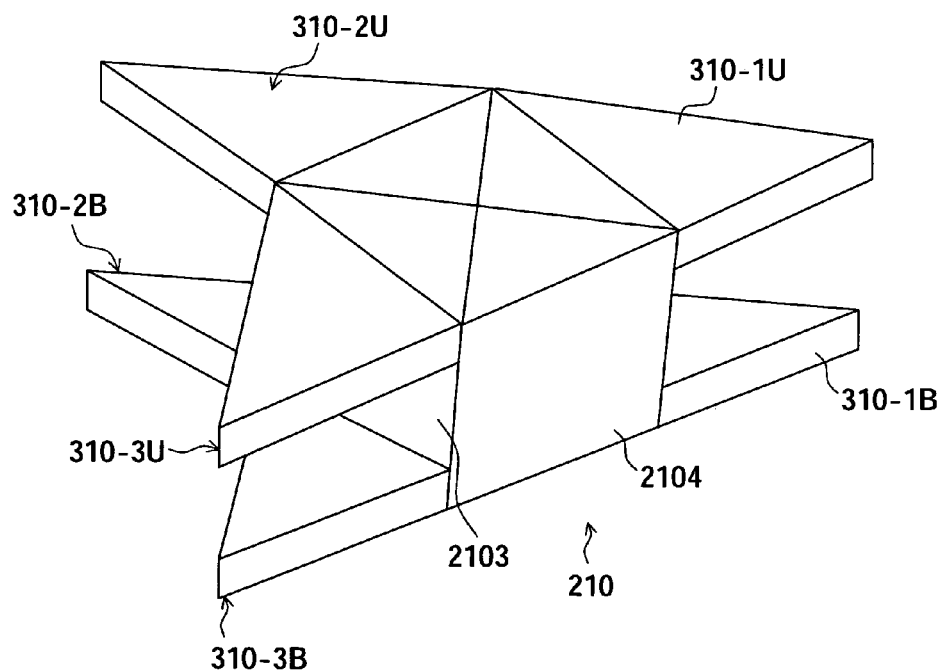
FIG. 6 is a view of a state where fixing plates are joined with three incident faces of a light combining prism.

FIG. 6 is a view of a state where fixing plates are joined with three incident faces of the light combining prism.

The light combining prism 210 and the fixing plate 310 are joined as shown in FIG. 6. In the example of this figure, one incident face of the light combining prism 210 has two fixing plates joined to its upper end lower edges in FIG. 6. Specifically, side faces 311 of fixing plates 310-1U and 310-1B having the same shape and same size are joined to the first face 2101 of the light combining prism 210 by a binder etc. Side faces 311 of fixing plates 310-2U and 310-2B having the same shape and same size are joined to the second face 2102 of the light combining prism 210 by a binder etc. Side faces 311 of fixing plates 310-3U and 310-3B having the same shape and same size are joined to the third face 2103 of the light combining prism 210 by a binder etc.

At this time, faces 312 for joining the reflection type polarization elements constituted by the first to third PBFs 261 to 263 of each two fixing plates 310-1U and 310-1B, 310-2U and 310-2B, and 310-3U and 310-3B attached to the same incident faces of the light combining prism 210 are parallel or substantially parallel and located on substantially the same plane in perpendicular directions.

FIGS. 7A and 7B are views of a state where reflection type polarization elements constituted by the PBFs are attached to the fixing plates.

As shown in FIGS. 7A and 7B, the reflection type polarization elements constituted by the first to third PBFs 261 to 263 are attached to faces 312 for joining the reflection type polarization elements of each two fixing plates 310-1U and 310-1B, 310-2U and 310-2B, and 310-3U and 310-3B.

Figure 8B:
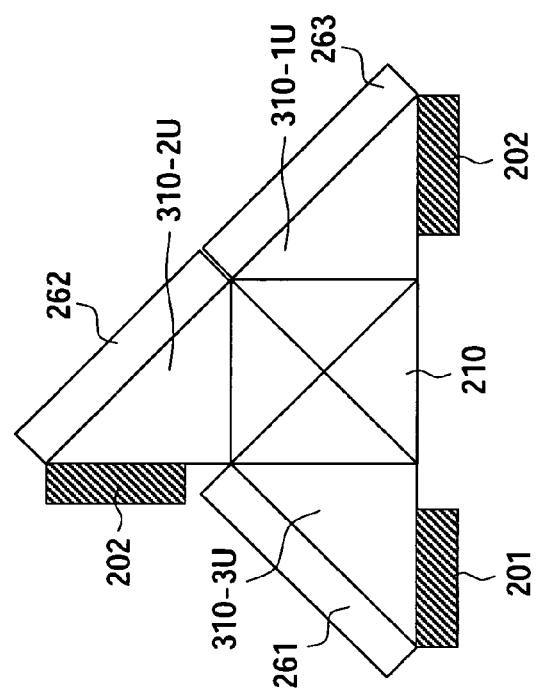
FIGS. 8A and 8B are views of a state where reflection type liquid crystal panels are attached to the fixing plates.
Figure 8A:
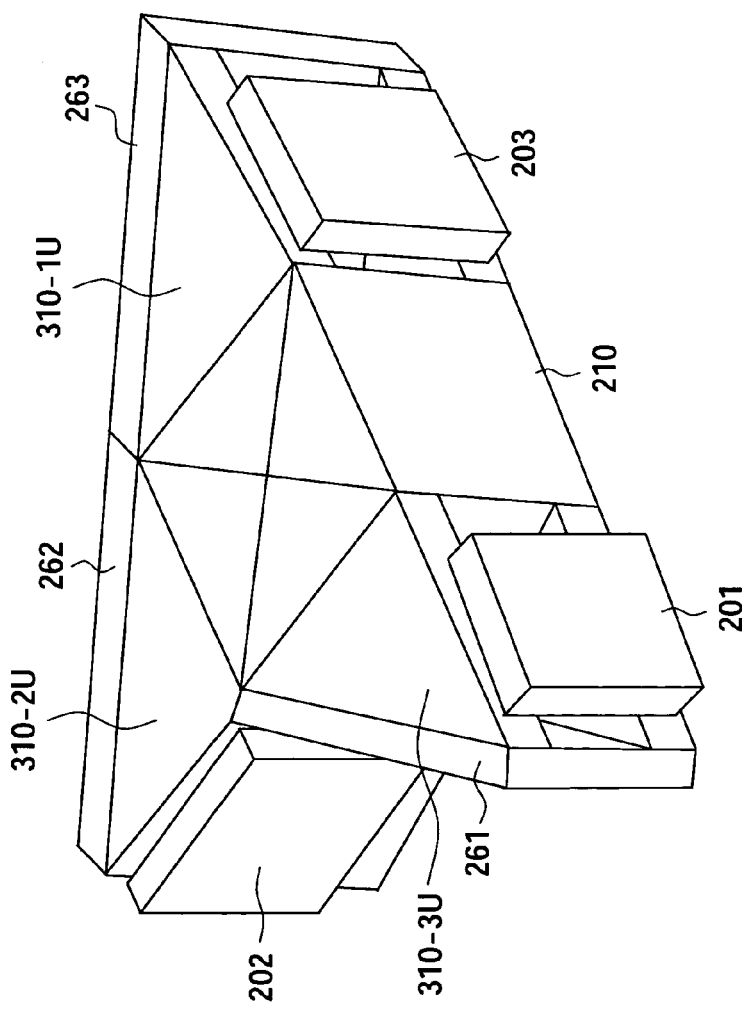

FIGS. 8A and 8B are views of a state where the reflection type liquid crystal panels constituted by the PBFs are attached to the fixing plates.

As shown in FIGS. 8A and 8B, the reflection type liquid crystal panels 201, 202, and 203 are attached to the faces 313 for holding the reflection type liquid crystal panels of each two fixing plates 310-1U and 310-1B, 310-2U and 310-2B, and 310-3U and 310-3B by for example a binder.

FIGS. 9A and 9B are views of an example of a preferred structure for attachment of the reflection type liquid crystal panels with respect to the fixing plates.

In order to adjust the positions of and fix the three reflection type liquid crystal panels 201, 202, and 203 so that their projection positions become equal, a structure as in for example FIGS. 9A and 9B is employed. "Prism side brackets 320U and 320B" are joined to the fixing plates 310U and 310B. "Panel side brackets 321U and 321B" are fixed to the reflection type liquid crystal panels 201 to 203 by screws etc. Then, the prism side brackets 320U and 320B and the panel side brackets 321U and 321B are joined. The prism side brackets 320U and 320B are formed so that their cross-sections form schematically L-shapes and can stably support the fixing plates 310U and 310B.

As the advantages of the attachment structure of FIGS. 9A and 9B, it can be mentioned that only screws 322-1U, 322-2U, 322-1B, and 322-2B need be detached for detaching the panel side brackets and the liquid crystal panels when replacing the liquid crystal panels. This is because a liquid crystal panel is expensive and the re-use is desired. As shown in FIGS. 8A and 8B, if this is directly connected to the fixing plate 310, after the liquid crystal panel is detached, it becomes necessary to remove the binder, solder, etc. used for joining them when re-using it.

Note that the panel side brackets may also be directly fixed to the fixing plates without using the prism side brackets.

As described above, in the present embodiment, the light combining prism 210 has the three reflection type liquid crystal panels 201 to 203 and the reflection type polarization elements constituted by the PBFs 261 to 263 joined and fixed to it by the fixing plates 310U and 310B. The fixing plates are made of glass materials. In the case of the related art, a material having a large linear expansion coefficient such as magnesium and aluminum was used, therefore the positions of the projected images of the three liquid crystal panels sometimes became deviated due to outer disturbance such as a temperature change. In the present embodiment, by fixing the reflection type liquid crystal panels 201 to 203 and the reflection type polarization elements constituted by the PBFs 261 to 263 to the light combining prism 210 by the same fixing plates 310, movements of the liquid crystal panels and/or reflection type polarization elements due to thermal expansion etc. are small. By forming the fixing plates 310 by a material having a linear expansion coefficient less than $10 \times 10^{-6}$ K$^{-1}$ such as a glass material, the amounts of movement are greatly reduced.

FIGS. 10 to 14 are views for explaining a further preferred structure for attaching the reflection type polarization elements constituted by the PBFs and the reflection type liquid crystal panels to the fixing plates.

Figure 10:
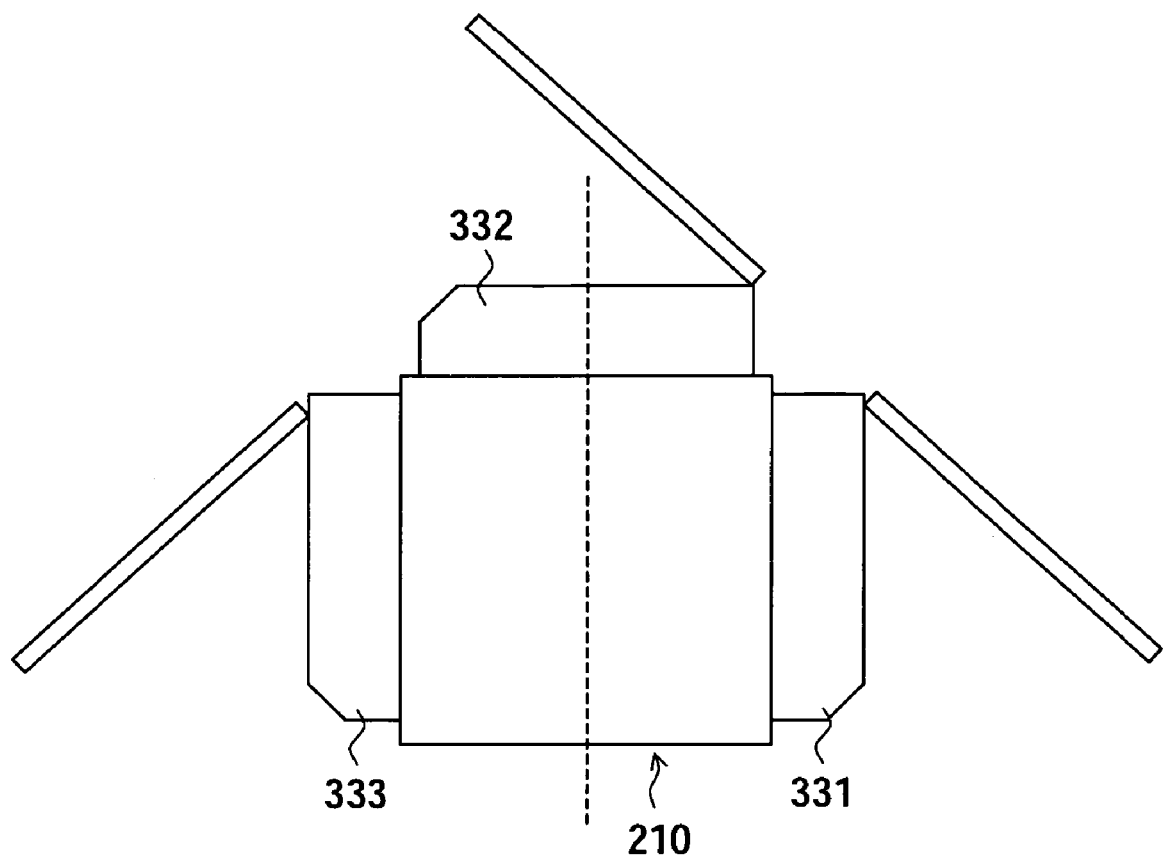
FIG. 10 is a top view for explaining a further preferred structure for attaching reflection type polarization elements constituted by PBFs and reflection type liquid crystal panels to the fixing plates.
Figure 11:
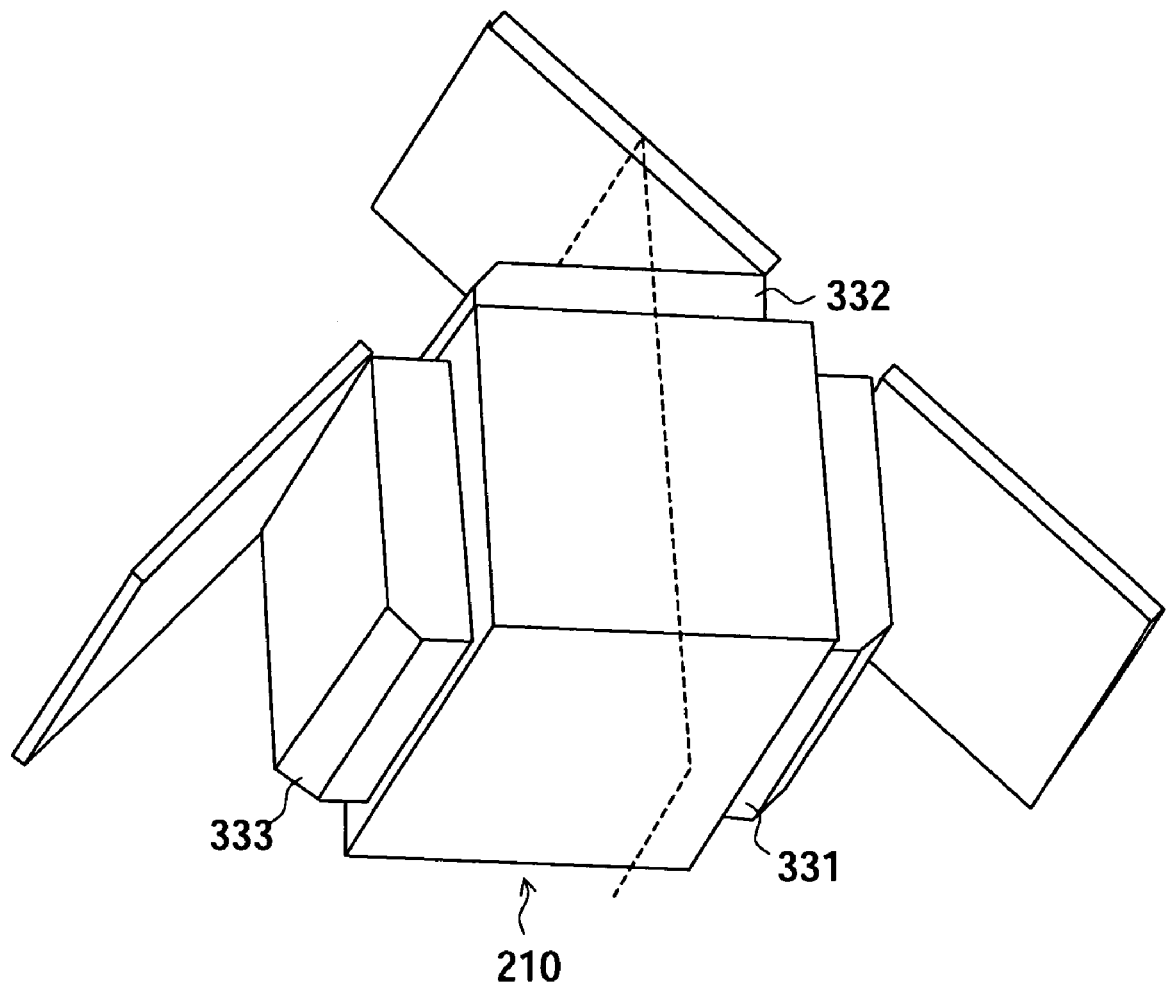
FIG. 11 is a perspective view for explaining a further preferred structure for attaching reflection type polarization elements constituted by PBFs and reflection type liquid crystal panels to the fixing plates.

In such an attachment structure, first, as shown in FIG. 10 and FIG. 11, transparent base plates (columnar shaped) 331 to 333 are joined to the light incident faces 2101, 2102, and 2103 of the light combining prism 210. These base plates 331 to 333 are shorter than the height of the light combining prism 210. Namely, the fixing plates 310 are formed on the upper end lower edges of the surfaces 2101, 2102, and 2103 so that they can be reliably supported by the faces of the light combining prism 210 and the transparent base plates 331 to 333. Here, the transparent base plates 331 to 333 will be referred to as "glass spacers".

Figure 12:
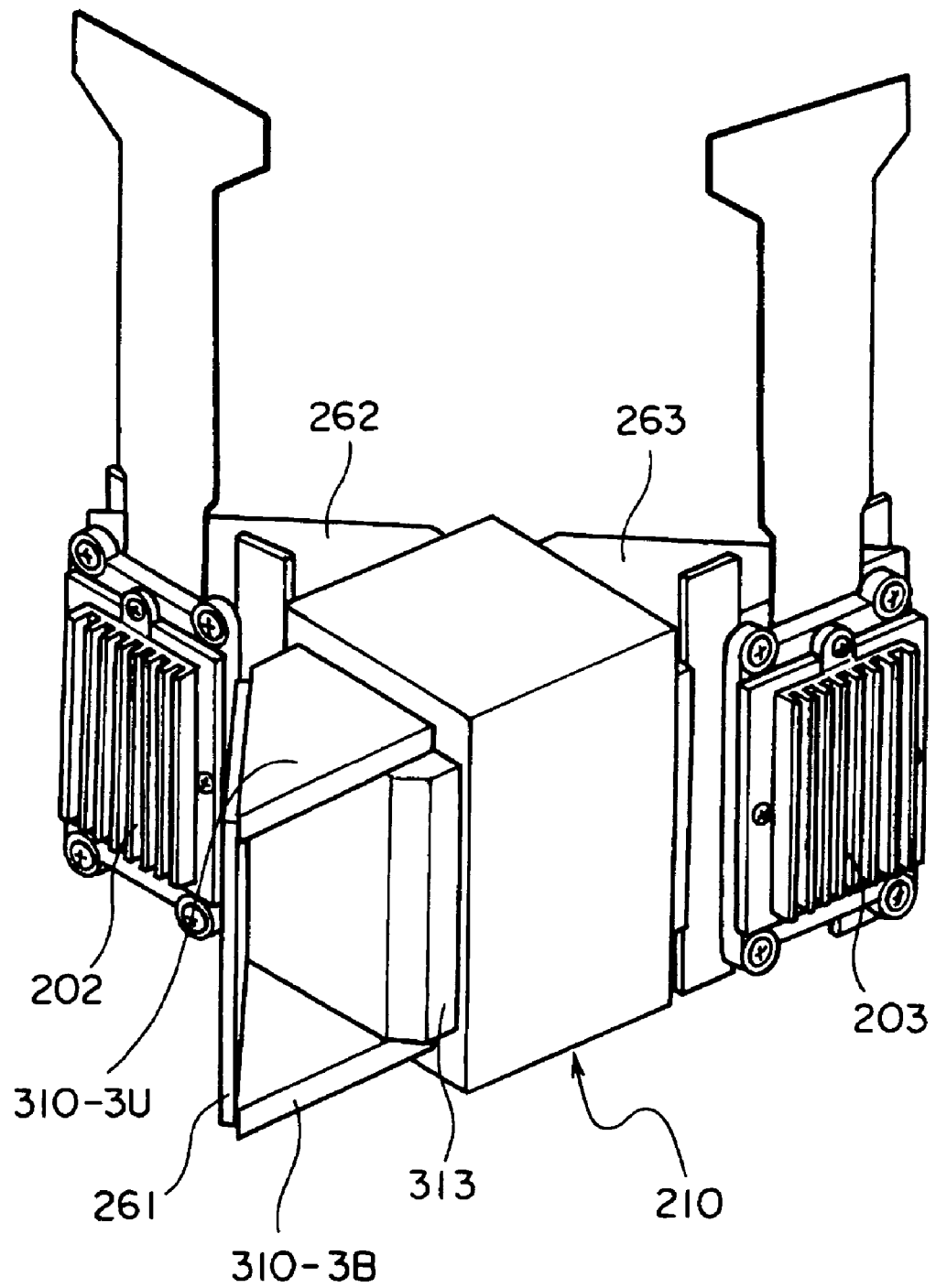
FIG. 12 is a perspective view for explaining a further preferred structure for attaching reflection type polarization elements constituted by PBFs and reflection type liquid crystal panels to the fixing plates.
Figure 13:
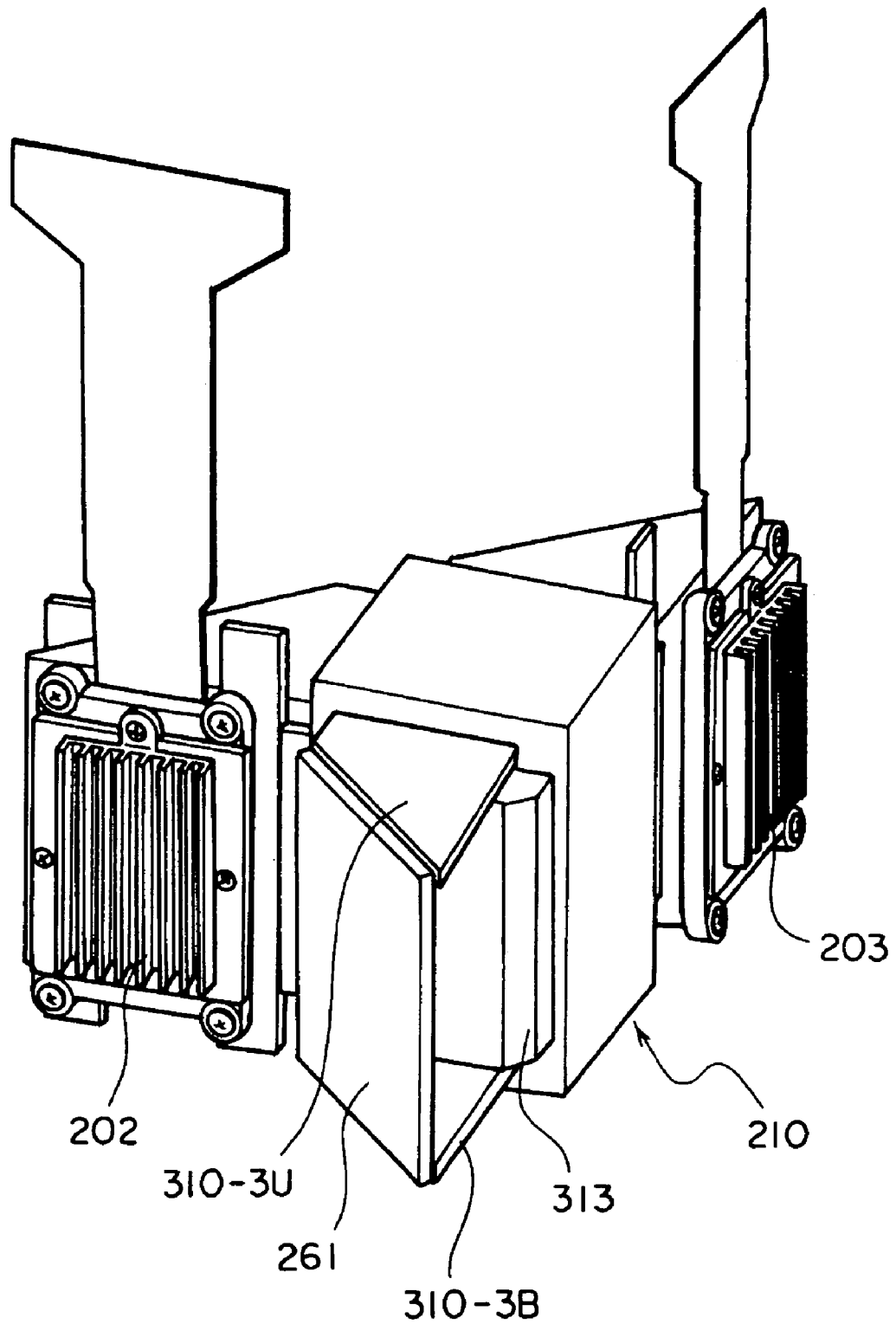
FIG. 13 is a perspective view for explaining a further preferred structure for attaching reflection type polarization elements constituted by PBFs and reflection type liquid crystal panels to the fixing plates.
Figure 14:
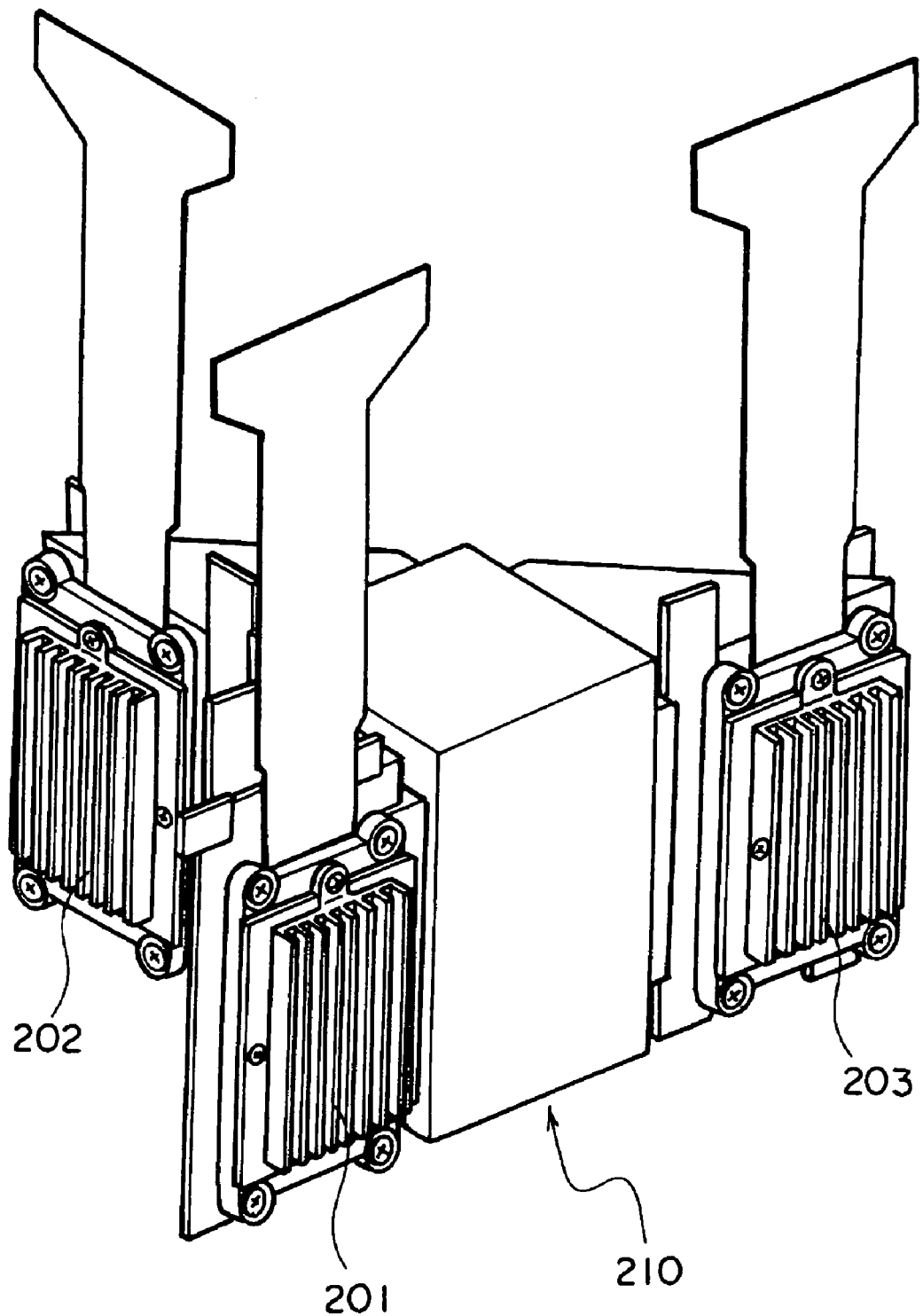
FIG. 14 is a view of the configuration after assembly of the optical apparatus when employing the attachment structure of FIG. 10 to FIG. 13.

Next, as shown in FIG. 12 and FIG. 13, single faces of the glass spacers 331 to 333 are made to abut against and are joined with the faces formed by incident faces 2101, 2102, and 2103 of the light combining prism 210. The other fixing plates are joined in the same way. Due to this, each fixing plate can be joined between the two faces of one face of a fixing plate and an incident face of the combining prism 210 without interposing another holding member etc., and a stable joint with a high precision becomes possible. FIG. 14 illustrates a case where the reflection type liquid crystal panel is attached.

Also, by such a configuration, space required for attachment etc. can be provided between for example the liquid crystal panel 202 and the light combining prism 210, and an increase of back focus of the projection lens 216 can be reduced.

Namely, the refractive index of air and the refractive index N of the glass spacers 331 to 333 are different, therefore light passing through interfaces between the air layer and the glass spacers 331 to 333 is refracted. This refraction phenomenon is based on Snell Law of Refraction. For this reason, the optical distance from the projection lens 216 to the liquid crystal panel (in the case of conversion assuming the medium to be air) becomes shorter in the case of provision of the glass spacers 331 to 333. When providing glass spacers 331 to 333 having a thickness of for example d, the distance becomes shorter by exactly an air conversion length of d(1−1/N). Due to this, the back focus of the projection lens 216 can be made shorter than that in the case where the glass spacers 331 to 333 are not provided.

Note that, the fixing plates 310 are formed by glass material/quartz/FeNiCo etc. The linear expansion coefficient is $10 \times 10^{-6}$ K$^{-1}$.

By employing the above attachment structure, it becomes possible to prevent registration deviation of the liquid crystal projector by a simple structure. Namely, registration deviation occurs due to the deviation of incident angles with respect to reflection faces 210a and 210b of the light combining prism 210. By using incident faces 2101, 2102, and 2103 of the light combining prism 210 machined with a high precision as reference surfaces and holding the PBFs 261 to 263 upon the fixing plates joined to the incident faces, the position deviation due to the change of temperature of at least the PBFs 261 to 263 which becomes the cause of the deviation of incident angles with respect to the reflection faces 210a and 210b can be suppressed to the minimum as a change of the dimensions of the small sized fixing plates 310.

Figure 15:
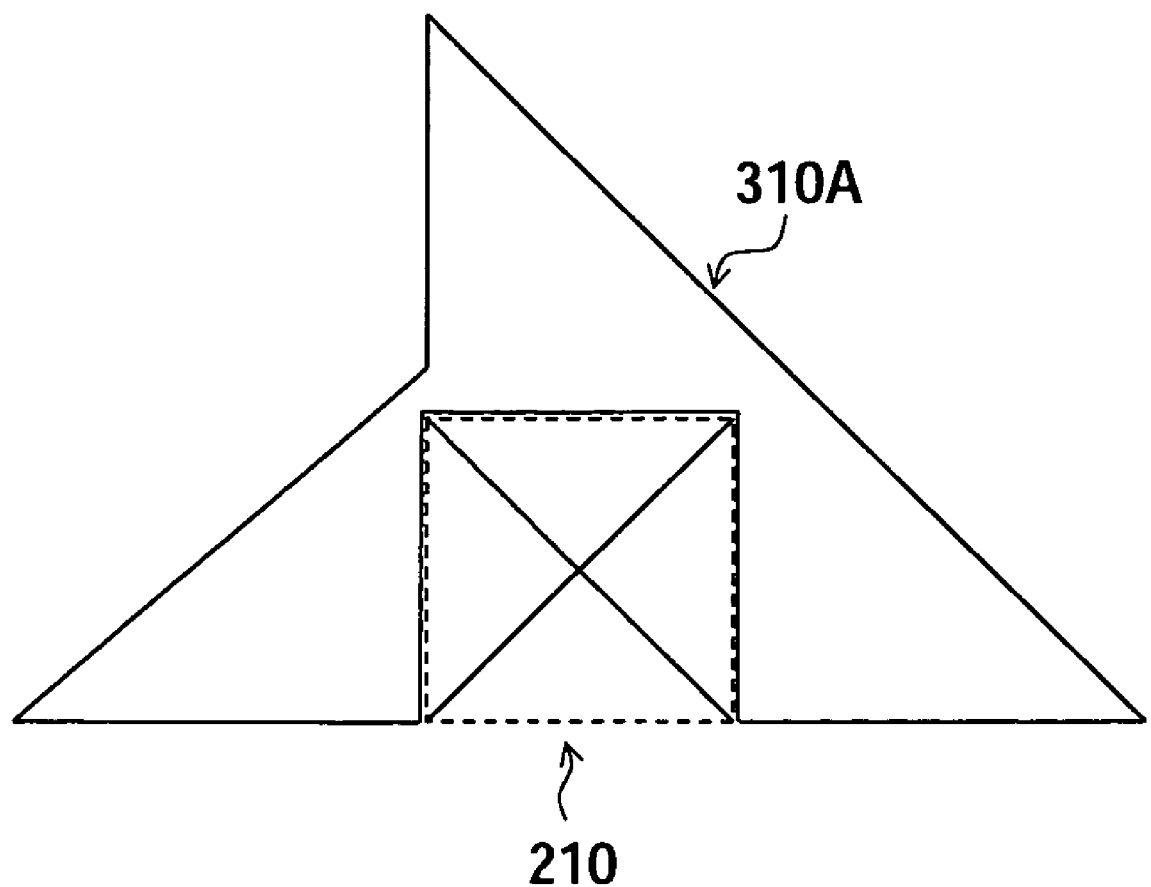
FIG. 15 is a view of an example of an integrally formed fixing plate.

Note that, in the above explanation, the example of use of an apparatus in which fixing plates 310 were individually formed was shown, but as shown in FIG. 15, it is also possible to apply the invention to an apparatus in which the fixing plates are integrally formed. In this case, by applying it to an attachment structure with reference to FIG. 10 to FIG. 14, simplification of the attachment process can be achieved, so this is practical.

Figure 16B:
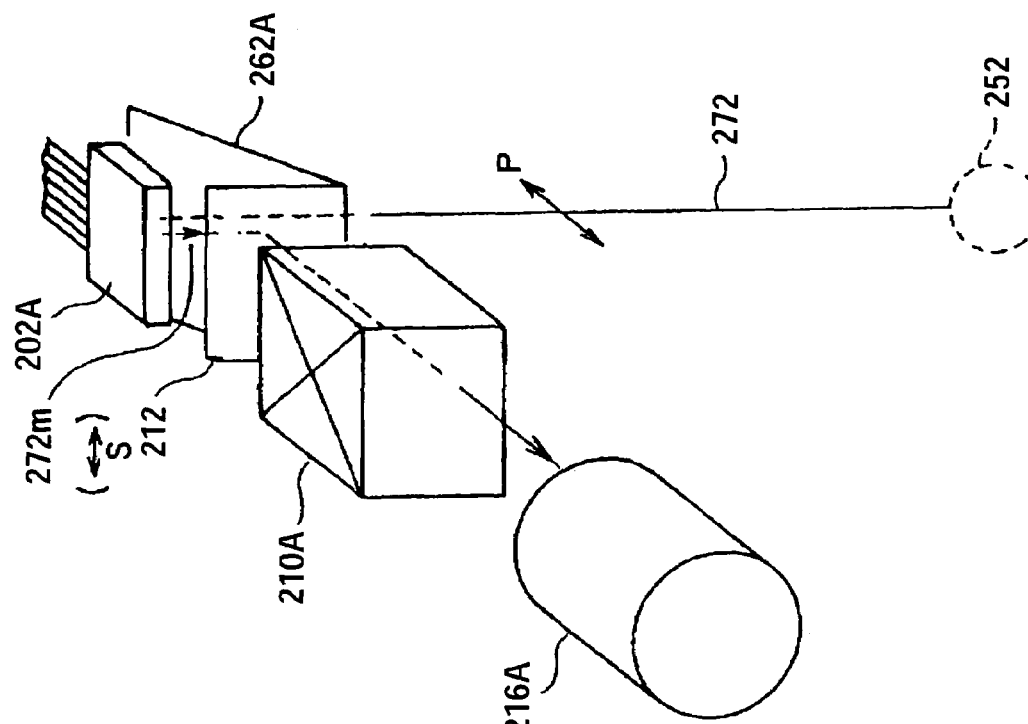
FIGS. 16A and 16B are perspective views showing a liquid crystal projector employing the optical apparatus according to a second embodiment of the present invention.
Figure 16A:
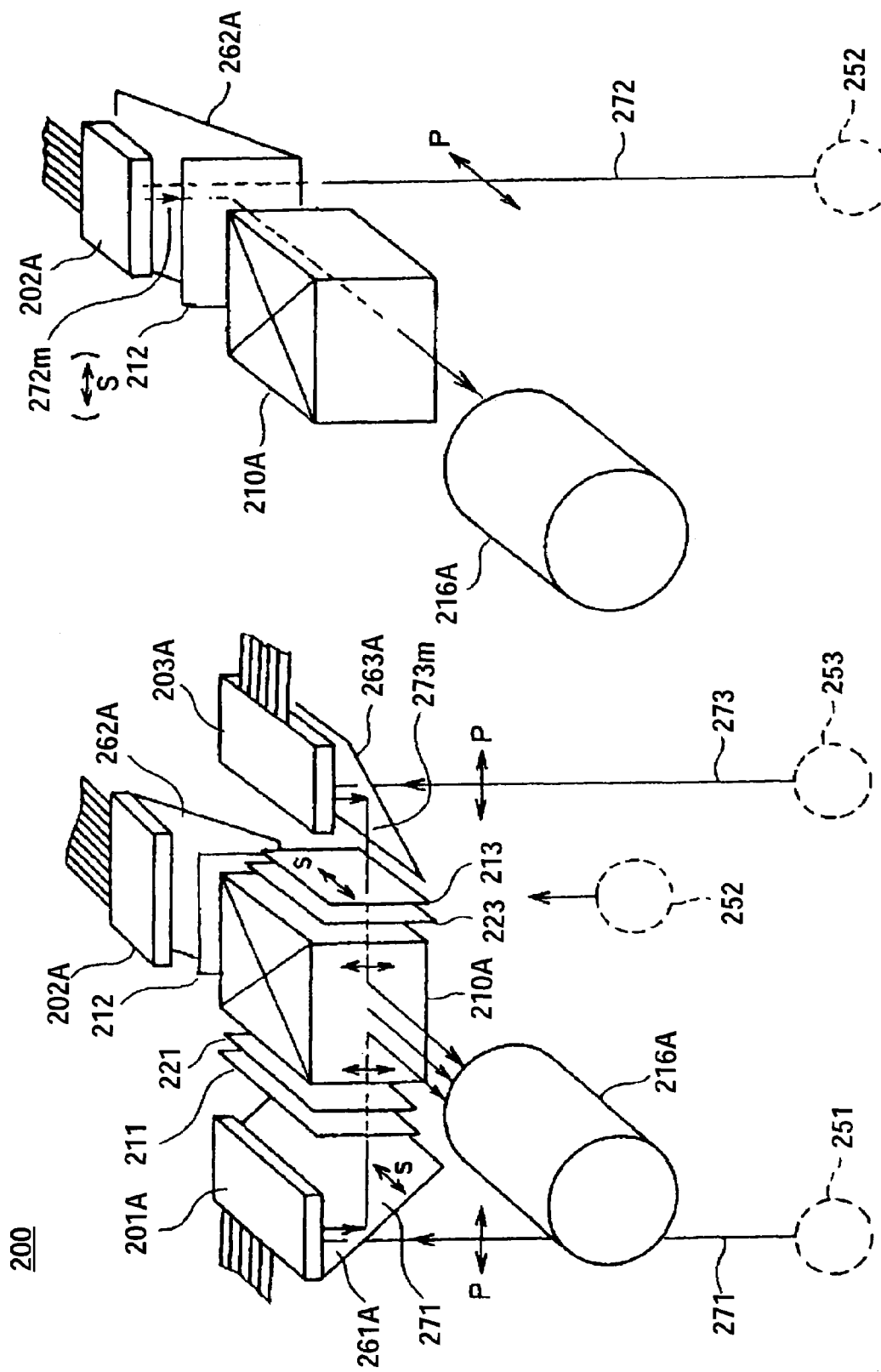
Figure 17:
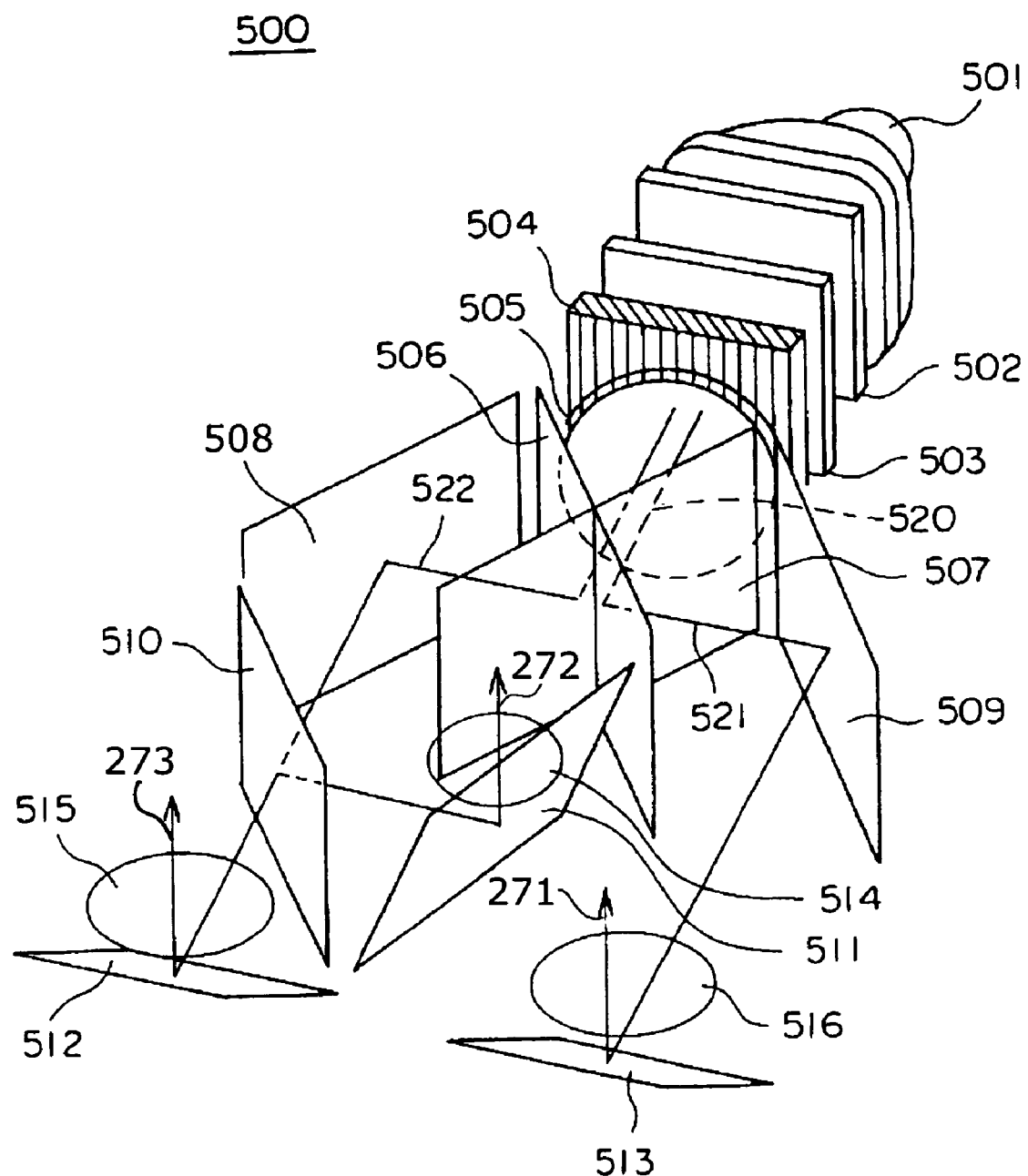
FIG. 17 is a view illustrating an example of the light source in the image projection apparatus illustrated in FIGS. 16A and 16B.
Figure 18:
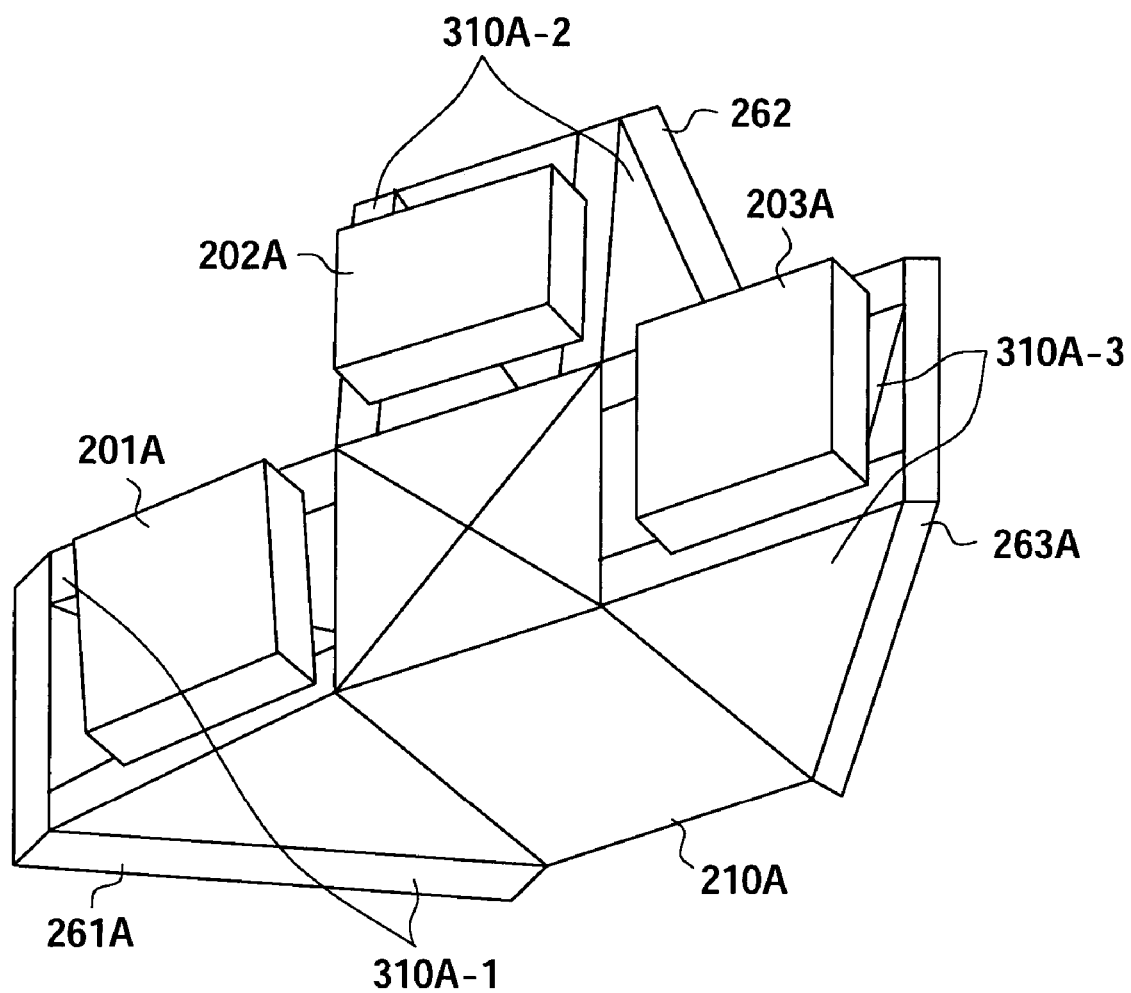
FIG. 18 is a view of a state where reflection type liquid crystal panels are attached to fixing plates in the second embodiment.
Figure 20:
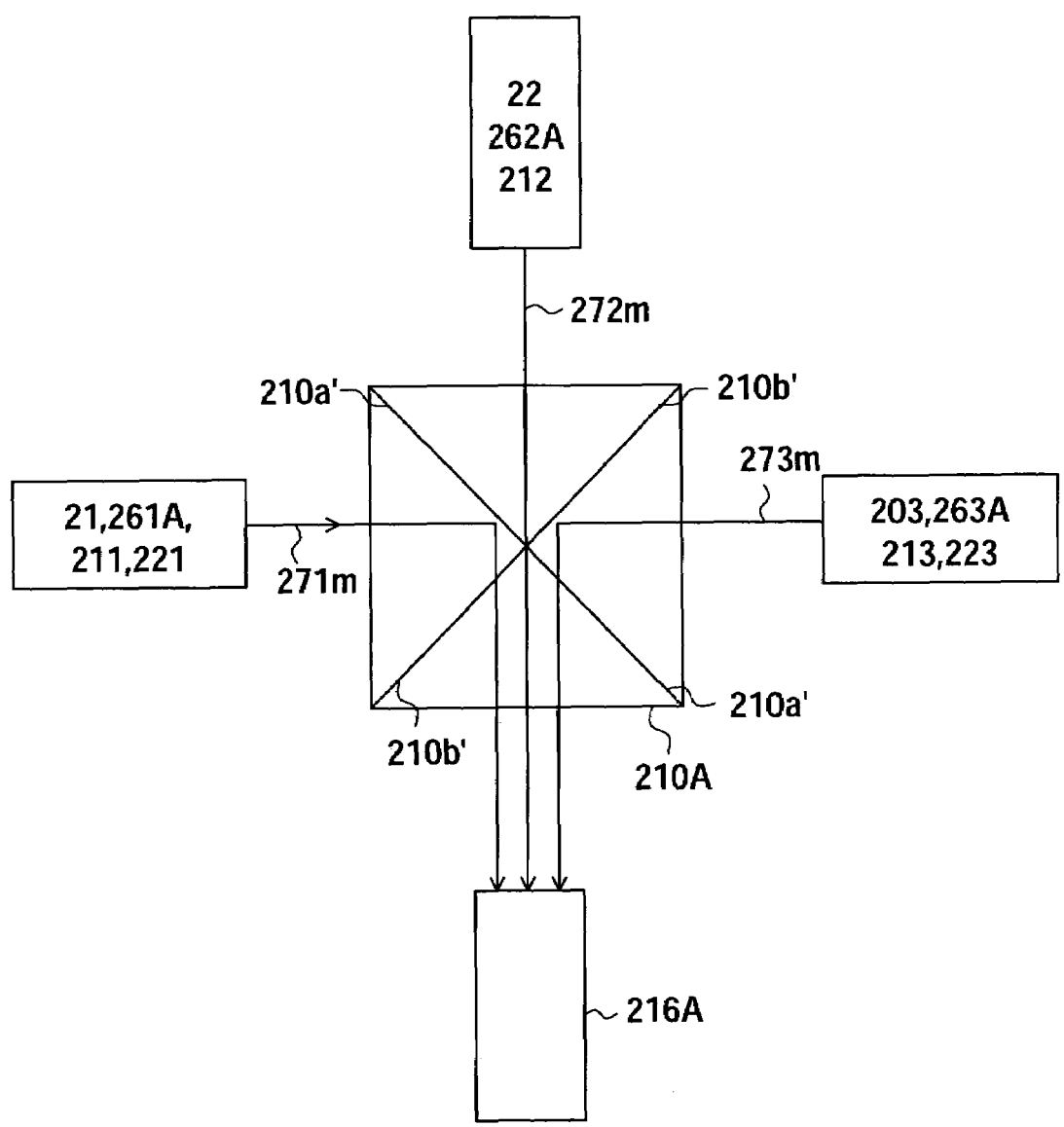
FIG. 20 is a view illustrating beam traces around the light combining prism illustrated in FIGS. 16A and 16B.

FIGS. 16A and 16B are perspective views of a liquid crystal projector employing an optical apparatus according to a second embodiment of the present invention. FIG. 17 is a view of an example of the configuration of the light source which can be applied to the projector illustrated in FIGS. 16A and 16B. FIG. 18 is a view of a state where reflection type liquid crystal panels are attached to fixing plates in the second embodiment. FIG. 19 is a view illustrating an example of the partial configuration and beam trace in the projector illustrated in FIGS. 16A and 16B. FIG. 20 is a view schematically showing an arrangement of the optical system around a cross prism provided in the projector illustrated in FIGS. 16A and 16B.

Principal Components of Projector

In FIGS. 16A and 16B, a projector 200 has a light combining prism (hereinafter referred to as a "cross prism") 210A at an illustrated center portion and a projection lens 216A in front of that. The projector 200 has the following optical systems in the three directions in total of the two sides of the light combining prism 210A and a side facing the projection lens 216A across the light combining prism 210A. In FIGS. 16A and 16B, on the left side of the light combining prism 210A, as a first optical system, provision is made of a first reflection type liquid crystal panel 201A, a first PBF 261A, a first linear polarization plate 211, and a first 1/n (n is an integer of 2 or more) wavelength plate 221. In FIGS. 16A and 16B, on the side facing the projection lens 216A across the light combining prism 210A, as a second optical system, provision is made of a second reflection type liquid crystal panel 202A, a second PBF 262A, and a second linear polarization plate 212. In FIGS. 16A and 16B, on the right side of the light combining prism 210A, as a third optical system, provision is made of a third reflection type liquid crystal panel 203A, a third PBF 263A, a third linear polarization plate 213, and a third 1/n wavelength plate 223.

The optical apparatus 300 according to the embodiment of the present invention is formed by the light combining prism 210A, the first optical system having the first reflection type liquid crystal panel 201A, the first PBF 261A, the first linear polarization plate 211, and the first 1/n wavelength plate 221, the second optical system having the second reflection type liquid crystal panel 202A, the second PBF 262A, and the second linear polarization plate 212, and the third optical system having the third reflection type liquid crystal panel 203A, the third PBF 263A, the third linear polarization plate 213, and the third 1/n wavelength plate 223.

Note that, in the second optical system, the second wavelength plate corresponding to the first and third wavelength plates 221 and 223 is not provided. The reason for that will be explained next. When three primary colors are combined in the light combining prism 210A, for two primary colors among the three primary colors, in the example of FIG. 20, light 271m striking a reflection face 210a' in the light combining prism 210A from the first optical system and light 273m striking the reflection face 210b' in the light combining prism 210A from the third optical system are reflected at the reflection faces 210a' and 210b' in the light combining prism 210A and thereby changed in phases by 90 degrees. On the other hand, the light striking the light combining prism 210A from the second optical system is not reflected in the light combining prism 210A. In order to adjust such phase inversion, the first optical system and the third optical system are provided with 1/n wavelength plates 221 and 223. It is not necessary to provide the 1/n wavelength plate for the second optical system.

How the two primary colors among the three primary colors are selected can be suitably selected. Note that, in the light combining prism 210A, the s polarized beam is suitable for reflection, and the p polarized beam is suitable for transmission. Accordingly, in the present embodiment, the polarization state is selected as exemplified.

The light combining prism 210A and the projection lens 216A are arranged on substantially the same plane. Sandwiching the light combining prism 210A, the first PBF 261A, the first linear polarization plate 211, and the first 1/n wavelength plate 221 of the first optical system, the second PBF 262A and the second linear polarization plate 212 of the second optical system, and the third PBF 263A, the third linear polarization plate 213, and the third 1/n wavelength plate 223 of the third optical system are arranged on substantially the same planes. In this way, the optical systems constituting the projector 200 are disposed (arranged) on substantially the same planes while sandwiching the light combining prism 210A between them.

The projector 200 of this embodiment of the present invention has three types of light sources 251 to 253 outputting three primary colors, that is, blue (B) light, green (G) light, and red (R) light, in addition to the components (optical parts) of the optical systems explained above. Details thereof will be explained in detail later.

In the present embodiment, each of the three reflection type liquid crystal panels 201A to 203A functions to spatially modulate light of one color among the three primary colors, that is, the blue (B) light, green (G) light, and red (R) light. The configurations of these reflection type liquid crystal panels 201A to 203A are substantially the same except that the 1/n wavelength plate is not provided in the second optical system. It can be arbitrarily determined which among them to spatially modulate each of the blue B light, green (G) light, and red (R) light. Namely, it can be arbitrarily designed which primary color light is to be modulated by each of the first reflection type liquid crystal panel 201A, the second reflection type liquid crystal panel 202A, and the third reflection type liquid crystal panel 203A.

The present embodiment will explain as an example a case where the first reflection type liquid crystal panel 201A is made to function as a red reflection type liquid crystal panel for modulating the image of the red light, the second reflection type liquid crystal panel 202A is made to function as a green reflection type liquid crystal panel for modulating the image of the green light, and the third reflection type liquid crystal panel 203A is made to function as a blue reflection type liquid crystal panel for modulating the image of the blue light. Naturally, for this purpose, a not shown image signal processing apparatus outputs an image signal for modulating the red color to the red reflection type liquid crystal panel 201A, an image signal for modulating the green color to the green reflection type liquid crystal panel 202A, and an image signal for modulating the blue color to the blue reflection type liquid crystal panel 203A in accordance with the image display content. Note that a detailed description of the image signal processing apparatus will be omitted.

Structure of Optical Apparatus

Next, the configuration of an optical apparatus used in the projector 200 will be shown. As described above, FIG. 18 is a view of a state where the reflection type liquid crystal panels are attached to the fixing plates in the projector 200. As shown in FIG. 18, the reflection type polarization elements constituted by the first to third PBFs 261A to 263A are attached to faces 312A for joining each two (pair of) fixing plates 310A-1, 310A-2, and 310A-3. Also, the reflection type liquid crystal panels 201A, 202A, and 203A are attached to the side above the light combining prism 211A (same side) with respect to the faces holding reflection type liquid crystal panels of each two (pair of) fixing plates 310A-1, 310A-2, and 310A-3 by for example a binder.

By employing such a configuration, when the ambient temperature changes, even when there is positional deviation (angle deviation) of the PBFs 261A to 263A due to the changes in dimensions of the fixing plates 310A, positional deviation of the projected video accompanying occurs in the same direction for the reflection type liquid crystal panels 201A, 202A, and 203A, therefore no registration deviation substantially occurs or is further reduced for the superposed videos.

Light Source

The projector 200 has a red illumination light source 251 for emitting red light 271 perpendicular to the surface of the red reflection type liquid crystal panel 201A, a green illumination light source 252 for emitting green light 272 perpendicular to the surface of the green reflection type liquid crystal panel 202A, and a blue illumination light source 253 for emitting blue light 273 perpendicular to the surface of the blue use reflection type liquid crystal panel 203A. Various configurations and arrangements of these red illumination light source 251, green illumination light source 252, and blue illumination light source 253 are possible, but in the present embodiment, use can be made of the configuration exemplified in FIG. 17. Note that in the image projection apparatus of the embodiment of the present invention, the light source is not an indispensable factor and can be of various forms other than that illustrated in FIG. 17. Accordingly, the light source illustrated in FIG. 17 is only an example.

A light source 500 illustrated in FIG. 17 has a lamp 501 outputting a white beam, fly eye integrators 502 and 503, a PS conversion element 504 for converting p polarization and s polarization, a red reflection dichroic mirror 506, a green and blue reflection dichroic mirror 507, all reflection mirrors 508, 509, 512, 511, and 513, and condenser lenses 515 and 516.

The white beam emitted from the lamp 501 becomes illumination light integrated by the fly eye integrators 502 and 503 and is aligned in polarization direction by the PS conversion element 504. The white illumination light 520 aligned in polarization direction in the PS conversion element 504 is condensed toward the reflection type liquid crystal panels 201A to 203A by a main condenser lens 505. The white light 520 is split by the red reflection dichroic mirror 506 and the green and blue reflection dichroic mirror 507 to a blue color, green color, and red color. The red reflected light 521 reflected at the red reflection dichroic mirror 506 is changed in its orientation (polarized) by the all reflection mirror 509, condensed by the condenser lens 516, is reflected at the all reflection mirror 513 toward the direction of the red reflection type liquid crystal panel 201A located above this light source 500, and becomes the red light 271. The reflected light 522 having green and blue spectrum reflected at the green and blue reflection dichroic mirror 507 is changed in its orientation (polarized) by the all reflection mirror 508 and reaches the green reflection dichroic mirror 510. Due to this green reflection dichroic mirror 510, the green light is reflected and changed in its orientation (polarized) to the direction of the all reflection mirror 511, is changed in its orientation to the upward direction of the light source 500.by the all reflection mirror 511, is condensed toward the green reflection type liquid crystal panel 202A of the projector 100 by the condenser lens 514, and becomes the green light 272. The light reflected at the all reflection mirror 508 is condensed at the condenser lens 515 and condensed toward the blue reflection type liquid crystal panel 203A of the projector 100 by the all reflection mirror 512 to become the blue light 273.

In the present specification and drawings, for convenience, in the light source 500 illustrated in FIG. 17, the portion for outputting the red light 271 will be called the "red illumination light source 251", the portion for outputting the green light 272 will be called the "green illumination light source 252", and the portion for outputting the blue light 273 will be called the "blue illumination light source 253", illustrated by the broken lines in FIGS. 16A and 16B.

FIG. 19 is a sectional view illustrating the positional relationships among the first reflection type liquid crystal panel 201A, the red illumination light source 251, and the first PBF 261A disposed between them as representative in an enlarged manner. As illustrated in FIG. 19, the illustrated projector 200 has a first PBF 261A arranged between the red illumination light source 251 and the red reflection type liquid crystal panel 201A in a state inclined by 45 degrees on the surface of the red reflection type liquid crystal panel 201A. The first PBF 261A is also arranged in a state inclined by substantially 45 degrees with respect to the red light 271 which is output from the red illumination light source 251 and incident upon the red reflection type liquid crystal panel 201A substantially perpendicular to the plane.

In the same way as above, the projector 200 has a second PBF 262A arranged between the green illumination light source 252 and the green reflection type liquid crystal panel 202A in a state inclined by 45 degrees on the surface of the green reflection type liquid crystal panel 202A. The second PBF 262A is arranged in a state inclined by substantially 45 degrees also with respect to the green light 272 which is output from the green illumination light source 252 and incident upon the green reflection type liquid crystal panel 202A substantially perpendicular to the plane. Also, in the same way as above, the projector 200 has a third PBF 263A arranged between the blue illumination light source 253 and the blue reflection type liquid crystal panel 203A in a state inclined by 45 degrees on the surface of the blue reflection type liquid crystal panel 203A. The third PBF 263A is also arranged in the state inclined by substantially 45 degrees with respect to the blue light 273 which is output from the blue illumination light source 253 and incident upon the blue reflection type liquid crystal panel 203A substantially perpendicular to the plane.

Red Beam Trace

Next, a detailed description will be given of the relationships among the red reflection type liquid crystal panel 201A, the red illumination light source 251, and the first PBF 261A with reference to FIGS. 19A and 19B. The red illumination light source 251 emits red light 271 perpendicular to the surface of the red reflection type liquid crystal panel 201A through the first PBF 261A. In the present embodiment, the red illumination light source 251 emits the red light 271 toward the red reflection type liquid crystal panel 201A from the bottom portion of the red reflection type liquid crystal panel 201A. The red light 271 output from the red illumination light source 251 passes through the first PBF 261A having the p polarization axis parallel to the sheet surface and strikes the red reflection type liquid crystal panel 201A. As illustrated in FIG. 19A, when the red light 271 is not modulated at the red reflection type liquid crystal panel 201A, the red light 271 having the p polarization axis is reflected at the red reflection type liquid crystal panel 201A, strikes the first PBF 261A again as it is, and returns to the red illumination light source 251. As illustrated in FIG. 19B, on the other hand, when the red light 271 is modulated at the time of reflection at the red reflection type liquid crystal panel 201A, the red light 271 having the p polarization axis parallel to the sheet surface becomes the red modulated light 271m having the s polarization axis vertical to the sheet surface and striking the first PBF 261A, is reflected at the first PBF 261A to the light combining prism 210A side, passes through the first linear polarization plate 211 and the first 1/n wavelength plate 221, and goes toward the light combining prism 210A.

In the red illumination light source 251, the polarization axis is previously adjusted so as to output red light 271 that has the illustrated polarization axis (axis parallel to the figure) so as to become a p polarized beam with respect to the first PBF 261A. The orientation of the first PBF 261A is set to one that allows the p polarized beam with respect to the first PBF 261A to pass therethrough and reflects the s polarized beam. Accordingly, the red light 271 emitted from the red illumination light source 251 having the illustrated polarization axis passes through the first PBF 261A and strikes the red reflection type liquid crystal panel 201A.

The red reflection type liquid crystal panel 201A, the green reflection type liquid crystal panel 202A, and the blue reflection type liquid crystal panel 203A are set so as to modulate their polarization planes so that these reflection panels 201A to 203A do not rotate the polarization planes of the incident light when 0% black color is displayed, while rotate the polarization planes of the incident light by substantially 90 degrees when 100% of blue, red, and green are displayed. Which color of display is carried out by modulation work performed by the reflection type liquid crystal panels 201A to 203A depends upon the image signals input to these reflection type liquid crystal panels 201A to 203A from for example an image signal processing apparatus (not shown).

As illustrated in FIG. 19A, when the red reflection type liquid crystal panel 201A displays 0% black, the red light 271 passes through the first PBF 261A and strikes the red reflection type liquid crystal panel 201a, but is reflected at the red reflection type liquid crystal panel 201A as it is, passes through the first PBF 261A again, and returns to the red illumination light source 251 side.

As illustrated in FIG. 19B, in the case of 100% red display of the red reflection type liquid crystal panel 201A, the red light 271 passes through the first PBF 261A, strikes the red reflection type liquid crystal panel 201A, and is reflected at the red reflection type liquid crystal panel 201a-during which time it is rotated in its polarization axis by 90 degrees by the red reflection type liquid crystal panel 201A, therefore becomes the red modulated light 271m having the p polarization axis, and the polarization axis of the red modulated light 271m at that time becomes the s axis perpendicular to the sheet surface, becomes the s polarized beam with respect to the first PBF 261A, is reflected at the first PBF 261A, passes through the first linear polarization plate 211, and advances to the direction of the light combining prism 210A through the first 1/n wavelength plate 221. The red modulated light 271 passes through the first linear polarization plate 211 and the first 1/n wavelength plate 221 arranged between the first PBF 261A and the prism 210A before striking the light combining prism 210A in this way. The polarized beam transmission axis of the first linear polarization plate 211 is set to substantially the same orientation as that of the s polarized beam with respect to the first PBF 261A, and the red modulated light 271m can pass through the first linear polarization plate 211 as it is. The axis of the first 1/n wavelength plate 221 is set so as to form an angle of 45 degrees with respect to its polarization axis. The polarization axis of the red modulated light 271m passed through the first 1/n wavelength plate 221 becomes an orientation which becomes the s polarized beam with respect to the reflection face of the light combining prism 210A.

As illustrated in FIG. 20, the reflection face 210a' of the light combining prism 210A is formed (coated) with a coating for reflecting the red color. The red modulated light 271m is reflected at the reflection face 210a', goes toward the projection lens 216A, and is imaged (projected) onto the screen (not shown) located in front of the projection lens 216A.

Blue Beam Trace

Next, a description will be given of the blue beam trace (path). The blue beam trace is basically the same as the red beam trace described above. The blue light 273 output from the blue illumination light source 253 located beneath the blue reflection type liquid crystal panel 203A and the third PBF 263A passes through the third PBF 263A and strikes the blue reflection type liquid crystal panel 203A. The polarization axis is previously adjusted so that the blue light 273 has a polarization axis so that it becomes a p polarized beam with respect to the third PBF 263A. The third PBF 263A is set in orientation so that it passes the p polarization axis with respect to the third PBF 263A and reflects the s polarized beam, therefore passes the blue light 273 having the above polarization axis and makes it strike the blue reflection type liquid crystal panel 203A.

In the case of 0% black display of the blue reflection type liquid crystal panel 203A, the blue light 273 passed through the third PBF 263A and striking the blue reflection type liquid crystal panel 203A is reflected at the blue reflection type liquid crystal panel 203A as it is and passes through the third PBF 263A again while keeping the p polarization axis as it is so as to return to the blue illumination light source 253 side.

In the case of 100% blue display of the blue reflection type liquid crystal panel 203A, the blue light 273 passed through the third PBF 263A and striking the blue reflection type liquid crystal panel 203A is rotated in its polarization axis by 90 degrees when reflected at the blue reflection type liquid crystal panel 203A and becomes the blue modulated light 273m having the s polarization axis. This blue modulated light 273m has a polarization axis which becomes the s polarized beam and becomes the s polarized beam with respect to the third PBF 263A, therefore is reflected at the third PBF 263A, passes through the third linear polarization plate 213 and the third 1/n wavelength plate 223, and advances in the direction of the light combining prism 210A. In this way, the blue modulated light 273m passes through the third linear polarization plate 213 and the third 1/n wavelength plate 223 arranged between the third PBF 263A and the light combining prism 210A before striking the light combining prism 210A. The third linear polarization plate 213 has the polarized beam passage axis set to schematically the same orientation as that of the s polarized beam with respect to the third PBF 263A, so the blue modulated light 273m can pass as it is. The third 1/n wavelength plate 223 is set in its axis so as to exhibit an angle of 45 degrees with respect to its polarization axis. The polarization axis of the blue modulated light 273m passed through this gets an orientation which becomes the s polarized beam with respect to the reflection face of the light combining prism 210A. Also, the reflection face 210b' of the prism 210A is formed with a coating for reflecting the blue color. The blue modulated light 273m is reflected at the reflection face 210b' and goes toward the projection lens 216A where it is imaged (projected) onto the screen by the projection lens 216A.

Green Beam Trace

Next, a description will be given of the green beam trace (path). The green beam trace is also basically the same as the blue beam trace described above. The green light 272 output from the green illumination light source 252 located beneath the green reflection type liquid crystal panel 202A and the second PBF 262A passes through the second PBF 262A and strikes the green reflection type liquid crystal panel 202A. The green light 272 output from the green illumination light source 252 is previously adjusted in polarization axis so as to have a polarization axis that becomes a p polarized beam with respect to the second PBF 262A. The second PBF 262A is set in orientation so as to pass the p polarized beam with respect to the second PBF 262A therethrough and reflects the s polarized beam, therefore the second PBF 262A passes the green light 272 having the polarization axis of the s polarized beam therethrough and makes it strike the green reflection type liquid crystal panel 202A.

In the case of 0% black display of the green reflection type liquid crystal panel 202A, the green light 272 is reflected at the green reflection type liquid crystal panel 202A as it is and passes through the second PBF 262A again while keeping the p polarization axis as it is, then returns to the green illumination light source 252 side.

In the case of 100% green display of the green reflection type liquid crystal panel 202A, the green light 272 passes through the second PBF 262A and is rotated in its polarization axis by 90 degrees when reflected at the green reflection type liquid crystal panel 202A, so becomes the green modulated light 272m having the polarization axis of the s polarized beam. The green modulated light 272m has the polarization axis of the s polarized beam and becomes an s polarized beam. Since it becomes an s polarized beam with respect to the second PBF 262A, it is reflected at the second PBF 262A and advances in the direction of the light combining prism 210A. The green modulated light 272m passes through the second linear polarization plate 212 arranged between the second PBF 262A and the light combining prism 210A before striking the light combining prism 210A. The second linear polarization plate 212 has a polarized beam passage axis set to substantially the same orientation as that of the s polarized beam with respect to the second PBF 262A, so the green modulated light 272m can pass through the second linear polarization plate 212 as it is.

Note that, as mentioned above, the second optical system is not provided with the second wavelength plate corresponding to the first and third polarization plates. The reflection faces 210a' and 210b' of the light combining prism 210A have coatings reflecting blue color and red color formed thereon, but the reflection faces 210a' and 210b' allow the green color to pass therethrough, therefore the green modulated light 271m incident upon the prism 210A is passed and goes toward the direction of the projection lens 216A where it is imaged (projected) onto the screen by the projection lens 216A.

Evaluation

Figure 21A:
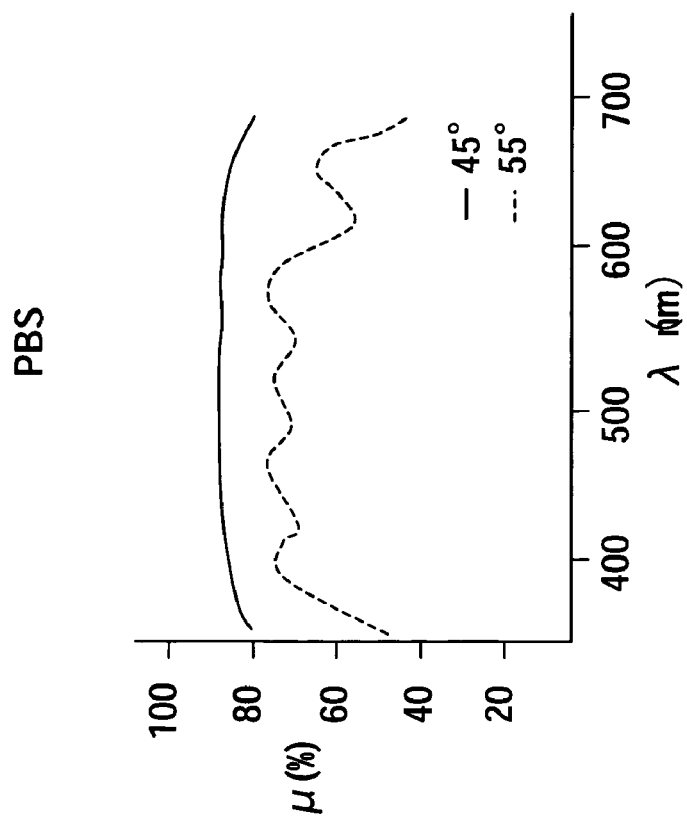
FIGS. 21A and 21B are graphs showing characteristics of the PBF and a polarized beam splitter (PBS).
Figure 21B:
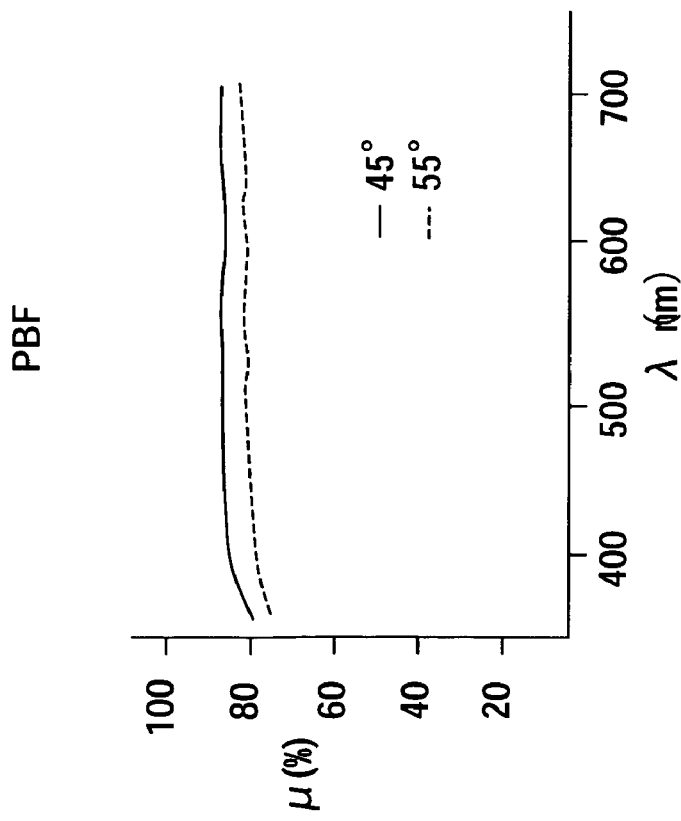

FIG. 21A is a graph illustrating the relationships between the wavelengths λ and transmittances μ of the first PBF 261A to the third PBF 263A (also referred to as the "PBFs") used for the projector 200 for the incident angles 45° and 55° upon for example the red reflection type liquid crystal panel 201A of the red light 271. FIG. 21B is a graph illustrating the relationships between the wavelengths λ and transmittances μ of the polarized beam splitters used for a projector in related art for the incident angles 45° and 55° upon for example the red reflection type liquid crystal panel of the red light.

(1) When comparing a PBS and a PBF, a PBF has a very low wavelength dependency in comparison with a PBS. Namely, when PBFs are used, all of blue, green, and red having different wavelengths have the same degree of transmittance, therefore there is a little change of the transmittance due to the wavelength difference depending upon the type of the three primary colors. As a result, for example the levels of colors arriving at the prism 210A become the same condition. In this way, according to the embodiment of the present invention, there is little reduction of the luminance and little reduction of the contrast. In other words, in comparison with a projector using PBS's, the F number of the projector 200 according to the embodiment of the present invention using the PBFs becomes small, resulting in a higher luminance and higher contrast also.

(2) A PBF has lower incident angle dependency than a PBS. Accordingly, in the projector 200 of the embodiment of the present invention using PBFs, even when there is a little inclination in the incident light upon the reflection type liquid crystal panels 201A to 203A, there is little reduction of the transmittance (little fluctuation of transmittance). As a result, for example, room is obtained in the arrangement of for example the red illumination light source 251 and the red reflection type liquid crystal panel 201A and the first PBF 261A. Namely, even when the optical arrangement of the red illumination light source 251, the first PBF 261A, and the red reflection type liquid crystal panel 201A is slightly deviated, there is little reduction of the luminance and reduction of the contrast. As a result, fine adjustment of positions of optical parts after assembling the optical system etc. becomes unnecessary.

When considering the configuration or structure of the projector 200 illustrated in FIGS. 16A and 16B, as schematically illustrated in FIG. 20, three optical systems for the three primary colors are arranged in an orderly manner on the periphery of the light combining prism 210A. When planarly considering this, for example, the first optical system for the red color (red reflection type liquid crystal panel 201A, first PBF 261A, first linear polarization plate 211, first 1/n wavelength plate 221) is arranged on the left side of the light combining prism 210A, the second optical system for the green color (green reflection type liquid crystal panel 202A, second PBF 262A, second linear polarization plate 212, second 1/n wavelength plate 222) is arranged on the right side of the light combining prism 210A, and the third optical system for the blue color (blue reflection type liquid crystal panel 203A, third PBF 263A, third linear polarization plate 213) is arranged on the side opposite to the projection lens 216A across the light combining prism 210A. These three optical systems are arranged in the three directions of the light combining prism 210A in that order. When cubically considering this, the above three optical systems are arranged at the same planar positions on the surface of the light combining prism 210A, therefore the dimension of the projector 200 in the height direction can be made smaller. In such an arrangement, no additional optical system for dividing the red light 271, green light 272, and blue light 273, for example, an all reflection mirror etc., is necessary. When considering the above description, the design of the layout of the projector 200 is easy, and also the efficiency of accommodation of the components is high, therefore the projector can be made compact, and a reduction in size and weight can be achieved.

A PBF is smaller in size and lighter in weight in comparison with a PBS. As a result, a further reduction in size and weight of the projector 200 can be achieved.

In the projector, the lamp portion of the light source and the liquid crystal panel portion consume large electric power and become high in temperature, therefore have to be cooled. In the projector 200 illustrated in FIGS. 16A and 16B and FIG. 17, image signals are applied to the red reflection type liquid crystal panel 201A, the green reflection type liquid crystal panel 202A, and the blue reflection type liquid crystal panel 203A to drive the liquid crystal panels, therefore the power consumption in the projector 200 is large and the temperature becomes high, so cooling becomes necessary. Naturally, also the lamp 510 portion of the light source 500 consumes much electric power and becomes high in temperature, so becomes necessary to cool. In the cooling of the red reflection type liquid crystal panel 201A, the green reflection type liquid crystal panel 202A, and the blue reflection type liquid crystal panel 203A, since these are arranged at the same height, cooling countermeasures are easy. For example, cooling air is blown in from a cooling fan in a horizontal direction along the surfaces of these reflection type liquid crystal panels 201A to 203A. The cooling effect is also high.

In the example illustrated in FIGS. 16A and 16B, all of the red illumination light source 251, green illumination light source 252, and blue illumination light source 253 can be constituted by for example a single light source 500 exemplified in FIG. 17, while the red illumination light source 251, the green illumination light source 252, and blue illumination light source 253, that is, the light source 500, are located beneath the prism 210A and the three optical systems. In this way, the light source 500 and the optical system can be cubically separated, therefore the cooling countermeasures can be separately carried out.

The amount of heat radiation of the lamp 501 of the light source 500 and the amounts of heat radiation of the reflection type liquid crystal panels 201A to 203A are very different from each other. The amount of heat radiation of the lamp 501 is overwhelmingly larger. As mentioned above, the optical system including the light source 500 and the reflection type liquid crystal panels 201A to 203A can be separately arranged, therefore the influence of heat of the lamp 501 of the light source 500 which may be exerted upon the reflection type liquid crystal panels 201A to 203A can be prevented. Accordingly, the reflection type liquid crystal panels 201A to 203A may be designed considering only cooling countermeasures for themselves. It is not necessary to consider useless cooling countermeasures. From that viewpoint, the cooling fan may be made small in size, and the projector 200 can be further made small in size and light in weight. Also, the noise of the cooling fan is low.

When the apparatus is configured with the light source 500, especially the lamp 501, arranged outside of the housing of the projector 200 accommodating the components illustrated in FIGS. 16A and 16B and only the white beam 520 from the lamp 501 is introduced, the cooling countermeasures become very easy.

The wiring connectors of the reflection type liquid crystal panels 201A to 203A (portions illustrated showing a large number of cables connected) are oriented in different directions. In addition, the reflection type liquid crystal panels 201A to 203A are located in the top part, therefore the wiring to the wiring connectors is easy. The number of cables to the reflection type liquid crystal panels 201A to 203A becomes considerably large, therefore the mounting surface has a big effect. In this way, according to the projector 200, there also are obtained the effects that laying the wiring is easy, little space is required for wiring, and compact wiring becomes possible.

As illustrated in FIGS. 16A and 16B, the components are not arranged around the projection lens 216A, therefore the flexibility of arrangement of the projection lens 216A is high and a vertical shift mechanism of the projection lens 216A can be easily mounted.

As illustrated in FIGS. 16A and 16B, the reflection type liquid crystal panels 201A to 203A are arranged facing downward. Accordingly, dust etc. floating in the housing of the projector 200 will not easily adhere to the panel surfaces of the reflection type liquid crystal panels 201A to 203A, the reduction in level of the polarized beam due to the adhesion of dust is small, and there is therefore little drop in the quality of the displayed image.

The focus optical system including the reflection type liquid crystal panels 201A to 203A is arranged compactly around the light combining prism 210A, so the structural rigidity of the mechanical is easily improved. For this reason, there is little deviation of pixel position etc. among three reflection type liquid crystal panels 201A to 203A, and a high quality image is obtained.

The image projection apparatus of the present invention is not limited to the above examples. Various modifications equivalent or similar to the embodiments mentioned above can be employed.

For example, the projector 200 illustrated in FIGS. 16A and 16B may be vertically reversed in orientation with for example the light source 500 (red illumination light source 251, green illumination light source 252, blue illumination light source 252) arranged at the top portion and the light combining prism 210A etc. arranged at the bottom portion, and the light source 500 and the light combining prism 210A etc. may be laterally arranged on the same plane.

It should be understood by those skilled in the art that various modifications, combinations, sub-combinations, and alterations may occur depending on design requirements and other factors insofar as they are within the scope of the appended claims or the equivalents thereof.

We claim:

1. An optical apparatus comprising:
a light combining prism having three light incident faces, the light combining prism receiving three beams of light having different wavelength bands through the three light incident faces and combining the three incident beams of light for output;
three reflection type liquid crystal panels;
three plate-like reflection type polarization elements disposed corresponding to the three reflection type liquid crystal panels, each receiving a different wavelength band of light among the three different wavelength bands, each selecting a first polarized beam component and making the selected first polarized beam component strike the corresponding reflection type liquid crystal panel, and each providing modulated light spatially modulated and converted to a second polarized beam component at the reflection type liquid crystal panel to the corresponding incident face of the light combining prism; and
at least three fixing plates having prism side faces, polarization side faces, and panel side faces, the fixing plates being fixed to the light incident faces of the light combining prism through the prism side faces, the reflection type polarization elements being fixed to the polarization side surfaces of the fixing plates, and the reflection type liquid crystal panels being fixed to the panel side faces of the fixing plates.

2. An optical apparatus as set forth in claim 1, wherein each of the fixing plates comprises a trigonal column.

3. An optical apparatus as set forth in claim 2, wherein the light incident faces of the light combining prism have optically transparent spacers joined to them, and the fixing plates are joined with the light incident faces in a state supported by side portions of the spacers.

4. An optical apparatus as set forth in claim 2, wherein fixing plates have prism side brackets joined with them, the reflection type liquid crystal panels have panel side brackets fastened to them, and the prism side brackets and the panel side brackets are joined to thus fix the reflection type liquid crystal panels to the corresponding light incident faces of the light combining prism.

5. An optical apparatus as set forth in claim 1, wherein the light incident faces of the light combining prism have optically transparent spacers joined to them, and the fixing plates are joined with the light incident faces in a state supported by side portions of the spacers.

6. An optical apparatus as set forth in claim 5, wherein a plurality of the fixing plates are joined with the light incident faces of the light combining prism at predetermined intervals.

7. An optical apparatus as set forth in claim 5, wherein the fixing plates have prism side brackets joined with them, the reflection type liquid crystal panels have panel side brackets fastened to them, and the prism side brackets and the panel side brackets are joined to thus fix the reflection type liquid crystal panels to the corresponding light incident faces of the light combining prism.

8. An optical apparatus as set forth in claim 1, wherein a plurality of the fixing plates are joined with the light incident faces of the light combining prism at predetermined intervals.

9. An optical apparatus as set forth in claim 1, wherein the fixing plates have linear expansion coefficients of $10 \times 10^{-6}$ $K^{-1}$ or less.

10. An optical apparatus as set forth in claim 1, wherein the fixing plates comprises glass.

11. An optical apparatus as set forth in claim 1, wherein the fixing plates comprises stainless steel or FeNiCo.

12. A projection apparatus comprising:
a light source,
an optical apparatus for splitting light generated from the light source into three light beams according to wavelength bands of the light, combining three modulated light beams, and emitting the combined modulated light beams, and
a projecting portion for outputting and projecting the light emitted from the optical apparatus, wherein the optical apparatus comprises:
a light combining prism having three light incident faces, the light combining prism receiving the three light beams of different wavelength bands through the three light incident faces, and combining the three incident beams of light for output, three reflection type liquid crystal panels, three plate-like reflection type polarization elements disposed corresponding to the three reflection type liquid crystal panels, each receiving a different wavelength band of light among the three different wavelength bands, each selecting a first polarized beam component and making the selected first polarized beam component strike the corresponding reflection type liquid crystal panel, and each providing modulated light spatially modulated and converted to a second polarized beam component at the reflection type liquid crystal panel to the corresponding incident face of the light combining prism, and at least three fixing plates having prism side faces, polarization side faces, and panel side faces, the fixing plates being fixed to the light incident faces of the light combining prism through the prism side faces, the reflection type polarization elements being fixed to the polarization side surfaces of the fixing plates, and the reflection type liquid crystal panels being fixed to the panel side faces of the fixing plates.

13. A projection apparatus as set forth in claim 12, wherein each of the fixing plates comprises a trigonal column.

14. A projection apparatus as set forth in claim 12, wherein the light incident faces of the light combining prism have optically transparent spacers joined to them, and the fixing plates are joined with the light incident faces in a state supported by side portions of the spacers.

15. A projection apparatus as set forth in claim 13, wherein the light incident faces of the light-combining prism have optically transparent spacers joined to them, and the fixing plates are joined with the light incident faces in a state supported by side portions of the spacers.

* * * * *